United States Patent
Doyle et al.

(10) Patent No.: US 11,048,486 B2
(45) Date of Patent: Jun. 29, 2021

(54) DEVELOPER TOOLS FOR A COMMUNICATION PLATFORM

(71) Applicant: Slack Technologies, Inc., San Francisco, CA (US)

(72) Inventors: Colm Stephen Doyle, Dublin (IE); Ankur Oberoi, San Francisco, CA (US); Matthew John Johnston, Dublin (IE)

(73) Assignee: Slack Technologies, Inc., San Francisco, CA (US)

(*) Notice: Subject to any disclaimer, the term of this patent is extended or adjusted under 35 U.S.C. 154(b) by 109 days.

(21) Appl. No.: 16/219,605

(22) Filed: Dec. 13, 2018

(65) Prior Publication Data
US 2020/0192643 A1    Jun. 18, 2020

(51) Int. Cl.
*G06F 8/38*    (2018.01)
*G06F 8/20*    (2018.01)
*H04L 29/08*    (2006.01)
*G06F 40/14*    (2020.01)

(52) U.S. Cl.
CPC ............... *G06F 8/38* (2013.01); *G06F 8/20* (2013.01); *G06F 40/14* (2020.01); *H04L 29/08981* (2013.01)

(58) Field of Classification Search
CPC ... G06F 8/38; G06F 8/20; G06F 40/14; H04L 29/08981
See application file for complete search history.

(56) References Cited

U.S. PATENT DOCUMENTS

| | | |
|---|---|---|
| 6,262,729 B1 | 7/2001 | Marcos et al. |
| 7,392,510 B1 | 6/2008 | Treder et al. |
| 9,980,100 B1 | 5/2018 | Charlton et al. |
| 2006/0026251 A1 | 2/2006 | Cheng et al. |
| 2009/0106676 A1 | 4/2009 | Brezina et al. |
| 2014/0282097 A1 | 9/2014 | Edlund et al. |

(Continued)

OTHER PUBLICATIONS

Paul Asjes, "Building Slack Bots," Jun. 2016, Packt Publishing (Year: 2016).*

(Continued)

*Primary Examiner* — Andrew T Chuisano
(74) *Attorney, Agent, or Firm* — Morrison & Foerster LLP

(57) ABSTRACT

Systems, apparatuses, methods, and computer program products are disclosed for providing app-less rendering in a group-based communication platform interface. An example method includes receiving a command indicative of a request to perform an app-less API call in the group-based communication platform, wherein the command comprises electronic information indicative of a requested API method name and a set of requested call parameters. The example method further includes generating an app-less API call based on the requested API method name and the set of requested call parameters. The example method further includes generating a response to the app-less API call. The example method further includes generating an app-less API call response message based on the command and the response to the app-less API call. Subsequently, the example method includes generating an ephemeral command response message based on the app-less API call response message.

21 Claims, 10 Drawing Sheets

(56) References Cited

U.S. PATENT DOCUMENTS

| | | | | |
|---|---|---|---|---|
| 2016/0098254 | A1* | 4/2016 | Paternostro | G06F 9/44589 717/105 |
| 2016/0239274 | A1* | 8/2016 | Strachota | G06F 8/10 |
| 2016/0360382 | A1 | 12/2016 | Gross et al. | |
| 2017/0161486 | A1* | 6/2017 | Jeon | H04L 63/083 |
| 2017/0315789 | A1* | 11/2017 | Lam | G06Q 10/067 |
| 2018/0081645 | A1* | 3/2018 | Alurralde Iturri | G06F 8/38 |
| 2018/0197144 | A1* | 7/2018 | Frank | H04L 63/101 |
| 2018/0287982 | A1 | 10/2018 | Draeger et al. | |
| 2019/0073633 | A1 | 3/2019 | Sama | |
| 2019/0190863 | A1* | 6/2019 | Baker | G06Q 10/10 |
| 2019/0222544 | A1* | 7/2019 | Ferrick | H04L 12/1813 |
| 2019/0230081 | A1* | 7/2019 | Singh | G06F 9/547 |
| 2020/0026536 | A1 | 1/2020 | Li et al. | |
| 2020/0068028 | A1* | 2/2020 | Gurtin | H04L 65/403 |

OTHER PUBLICATIONS

Benjamin Brandall, "21 Ways to Use Slack Bots to Simplify Everyday Tasks," Aug. 26, 2017, available at http://web.archive.org/web/20170826154106/https://www.process.st/slack-bots/. (Year: 2017).*

Slack, "Reminders API Methods and Scopes," Apr. 14, 2016, available at https://api.slack.com/changelog/2016-04-14-reminders-api. (Year: 2016).*

Slack Developer Tools | Slack App Directory [online][retrieved Dec. 13, 2018]. Retrieved from the internet: <https:/slack.com/apps/AARDLSURF-slack-developer-tools>. 6 pages.

Opening Keynote | Spec by Slack 2018—YouTube [online][retrieved Feb. 26, 2019]. Retrieved from the internet: <https://youtu.be/al81xLzh0tc?t=2406>. (May 23, 2018) 2 pages.

Inspect Element | Slack Platform Blog—Medium [online][retrieved Oct. 26, 2018]. Retrieved from the internet: <https://medium.com/slack-developer-blog/inspect-element-b6edla057734>. 4 pages.

Home | Slack Developer Tools [online][retrieved Oct. 26, 2018]. Retrieved from the internet: <https://devtools.builtbyslack.com/>. 3 pages.

Matsumoto, T. et al., "Chocoa Communicator—A New Communication System Based on Awareness and Text Communications—", Fujitsu Sol. Tech. J., 36, 2, (Dec. 2000) 154-161.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGACOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

Doyle et al., U.S. Office Action dated May 15, 2020, directed to U.S. Appl. No. 16/219,603; 27 pages.

International Search Report and Written Opinion dated Jul. 9, 2020, directed to PCT Application No. PCT/US2019/065872; 26 pages.

Invitation to Pay Additional Fees and Partial International Search dated Apr. 2, 2020, directed to International Application No. PCT/US2019/065872; 20 pages.

Thompson. (Mar. 2, 2015) "How to use Google Chrome Inspect Element tool," located at https://www.youtube.com/watch?v=1l4xz1QQhew (2 pages).

* cited by examiner

600

602 — RECEIVING, BY API CIRCUITRY, AN INSPECT COMMAND INDICATIVE OF A REQUEST TO PERFORM AN INSPECT ACTION ON AN INTERFACE ELEMENT VIEWABLE IN A GROUP-BASED COMMUNICATION PLATFORM INTERFACE

604 — GENERATING, BY INSPECT ACTION RESPONSE GENERATION CIRCUITRY, AN ELEMENT DEFINITION PAYLOAD BASED ON THE INSPECT COMMAND

606 — GENERATING, BY THE INSPECT ACTION RESPONSE GENERATION CIRCUITRY, AN INSPECT ACTION RESPONSE MESSAGE COMPRISING THE ELEMENT DEFINITION PAYLOAD

608 — GENERATING, BY INTERFACE GENERATION CIRCUITRY, AN EPHEMERAL ELEMENT DEFINITION MESSAGE BASED ON THE INSPECT ACTION RESPONSE MESSAGE

610 — TRANSMITTING, BY THE INTERFACE GENERATION CIRCUITRY, THE EPHEMERAL ELEMENT DEFINITION MESSAGE TO A CLIENT DEVICE

FIG. 6

DEVELOPER TOOLS FOR A COMMUNICATION PLATFORM

BACKGROUND

Communication platforms provide a limited set of developer tools to their users. Applicant has identified many deficiencies and problems associated with these existing communication platforms. Through applied effort, ingenuity, and innovation, Applicant has solved many of these identified deficiencies and problems by developing solutions in accordance with the embodiments of the present disclosure, many examples of which are described in detail herein.

BRIEF SUMMARY

Computing systems, computing apparatuses, computer-implemented methods, and computer program products are disclosed herein that solve the above problems by providing improved functionality in a group-based communication platform interface. For example, the group-based communication system provided herein provides for providing app-less rendering in a group-based communication platform interface.

In one example embodiment, a computing system is provided for providing app-less rendering in a group-based communication platform interface. The computing system may comprise application programming interface (API) circuitry in communication with interface generation circuitry and app-less API call response generation circuitry. The API circuitry may be configured to receive, from the interface generation circuitry, a command indicative of a request to perform an app-less API call in the group-based communication platform. The request may have been provided by a user using a client device, and wherein the command comprises electronic information indicative of a requested API method name and a set of requested call parameters. The API circuitry may be further configured to transmit, to the app-less API call response generation circuitry, the command. The API circuitry may be further configured to receive, from the app-less API call response generation circuitry, an app-less API call. The API circuitry may be further configured to generate a response to the app-less API call. The API circuitry may be further configured to transmit, to the app-less API call response generation circuitry, the response to the app-less API call. The API circuitry may be further configured to receive, from the app-less API call response generation circuitry, an app-less API call response message. The API circuitry may be further configured to transmit, to the interface generation circuitry, the app-less API call response message. The computing system may further comprise the app-less API call response generation circuitry. The app-less API call response generation circuitry may be configured to receive, from the API circuitry, the command. The app-less API call response generation circuitry may be further configured to generate the app-less API call based on the requested API method name and the set of requested call parameters. The app-less API call response generation circuitry may be further configured to transmit, to the API circuitry, the app-less API call. The app-less API call response generation circuitry may be further configured to receive from the API circuitry, the response to the app-less API call. The app-less API call response generation circuitry may be further configured to generate the app-less API call response message based on the command and the response to the app-less API call. The app-less API call response generation circuitry may be further configured to transmit, to the API circuitry, the app-less API call response message. The computing system may further comprise the interface generation circuitry. The interface generation circuitry may be in further communication with the client device. The interface generation circuitry may be configured to receive, from the API circuitry, the app-less API call response message. The interface generation circuitry may be further configured to generate an ephemeral command response message based on the app-less API call response message, wherein the ephemeral command response message is configured to be displayed, by a display device in communication with the client device, in the group-based communication platform interface in association with the request to perform the app-less API call. The interface generation circuitry may be further configured to transmit, to the client device, the ephemeral command response message.

In another example embodiment, a computing apparatus is provided for providing app-less rendering in a group-based communication platform interface. The computing apparatus may comprise API circuitry in communication with interface generation circuitry and app-less API call response generation circuitry, and wherein the API circuitry is configured to receive, from the interface generation circuitry, a command indicative of a request to perform an app-less API call in the group-based communication platform, wherein the request was provided by a user using a client device, and wherein the command comprises electronic information indicative of a requested API method name and a set of requested call parameters. The API circuitry may be further configured to transmit, to the app-less API call response generation circuitry, the command. The API circuitry may be further configured to receive, from the app-less API call response generation circuitry, an app-less API call. The API circuitry may be further configured to generate a response to the app-less API call. The API circuitry may be further configured to transmit, to the app-less API call response generation circuitry, the response to the app-less API call. The API circuitry may be further configured to receive, from the app-less API call response generation circuitry, an app-less API call response message. The API circuitry may be further configured to transmit, to the interface generation circuitry, the app-less API call response message. The computing apparatus may further comprise the app-less API call response generation circuitry. The app-less API call response generation circuitry may be configured to receive, from the API circuitry, the command. The app-less API call response generation circuitry may be further configured to generate the app-less API call based on the requested API method name and the set of requested call parameters. The app-less API call response generation circuitry may be further configured to transmit, to the API circuitry, the app-less API call. The app-less API call response generation circuitry may be further configured to receive from the API circuitry, the response to the app-less API call. The app-less API call response generation circuitry may be further configured to generate the app-less API call response message based on the command and the response to the app-less API call. The app-less API call response generation circuitry may be further configured to transmit, to the API circuitry, the app-less API call response message. The computing apparatus may further comprise the interface generation circuitry. The interface generation circuitry may be in further communication with the client device. The interface generation circuitry may be configured to receive, from the API circuitry, the app-less API call response message. The interface generation circuitry may be further configured to generate an ephemeral command response message based on the app-less API call response message, wherein the ephemeral command response message is configured to be displayed, by a display device in communication with the client device, in the group-based communication platform interface in association with the request to perform the app-less API call. The interface generation circuitry may be further configured to transmit, to the client device, the ephemeral command response message.

In another example embodiment, a computer-implemented method is provided for providing app-less rendering in a group-based communication platform interface. The computer-implemented method may comprise receiving, by API circuitry and from interface generation circuitry in communication with the API circuitry and a client device, a command indicative of a request to perform an app-less API call in the group-based communication platform. The request may have been provided by a user using the client device. The command may comprise electronic information indicative of a requested API method name and a set of requested call parameters. The computer-implemented method may further comprise generating, by app-less API call response generation circuitry in communication with the API circuitry, an app-less API call based on the requested API method name and the set of requested call parameters. The computer-implemented method may further comprise generating, by the API circuitry, a response to the app-less API call. The computer-implemented method may further comprise generating, by the app-less API call response generation circuitry, an app-less API call response message based on the command and the response to the app-less API call. The computer-implemented method may further comprise generating, by the interface generation circuitry, an ephemeral command response message based on the app-less API call response message. The ephemeral command response message may be configured to be displayed, by a display device in communication with the client device, in the group-based communication platform interface in association with the request to perform the app-less API call. The computer-implemented method may further comprise transmitting, by the interface generation circuitry and to the client device, the ephemeral command response message.

In another example embodiment, a computer program product is provided for providing app-less rendering in a group-based communication platform interface. The computer program product may comprise at least one non-transitory computer-readable storage medium storing computer-executable program code instructions. The computer-executable program code instructions may, when executed by a computing apparatus, cause the computing apparatus to receive, by API circuitry and from interface generation circuitry in communication with the API circuitry and a client device, a command indicative of a request to perform an app-less API call in the group-based communication platform. The request may have been provided by a user using the client device. The command may comprise electronic information indicative of a requested API method name and a set of requested call parameters. The computer-executable program code instructions, when executed, may further cause the computing apparatus to generate, by app-less API call response generation circuitry in communication with the API circuitry, an app-less API call based on the requested API method name and the set of requested call parameters. The computer-executable program code instructions, when executed, may further cause the computing apparatus to generate, by the API circuitry, a response to the app-less API call. The computer-executable program code instructions, when executed, may further cause the computing apparatus to generate, by the app-less API call response generation circuitry, an app-less API call response message based on the command and the response to the app-less API call. The computer-executable program code instructions, when executed, may further cause the computing apparatus to generate, by the interface generation circuitry, an ephemeral command response message based on the app-less API call response message. The ephemeral command response message may be configured to be displayed, by a display device in communication with the client device, in the group-based communication platform interface in association with the request to perform the app-less API call. The computer-executable program code instructions, when executed, may further cause the computing apparatus to transmit, by the interface generation circuitry and to the client device, the ephemeral command response message.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the drawings represent components that may or may not be present in various embodiments or features of the disclosure described herein. Accordingly, some embodiments or features of the present disclosure may include fewer or more components than those shown in the drawings while not departing from the scope of the disclosure.

FIG. 6 illustrates an example flowchart for inspecting an interface element viewable in a group-based communication platform interface in accordance with some example embodiments described herein;

DETAILED DESCRIPTION

Figure 1:
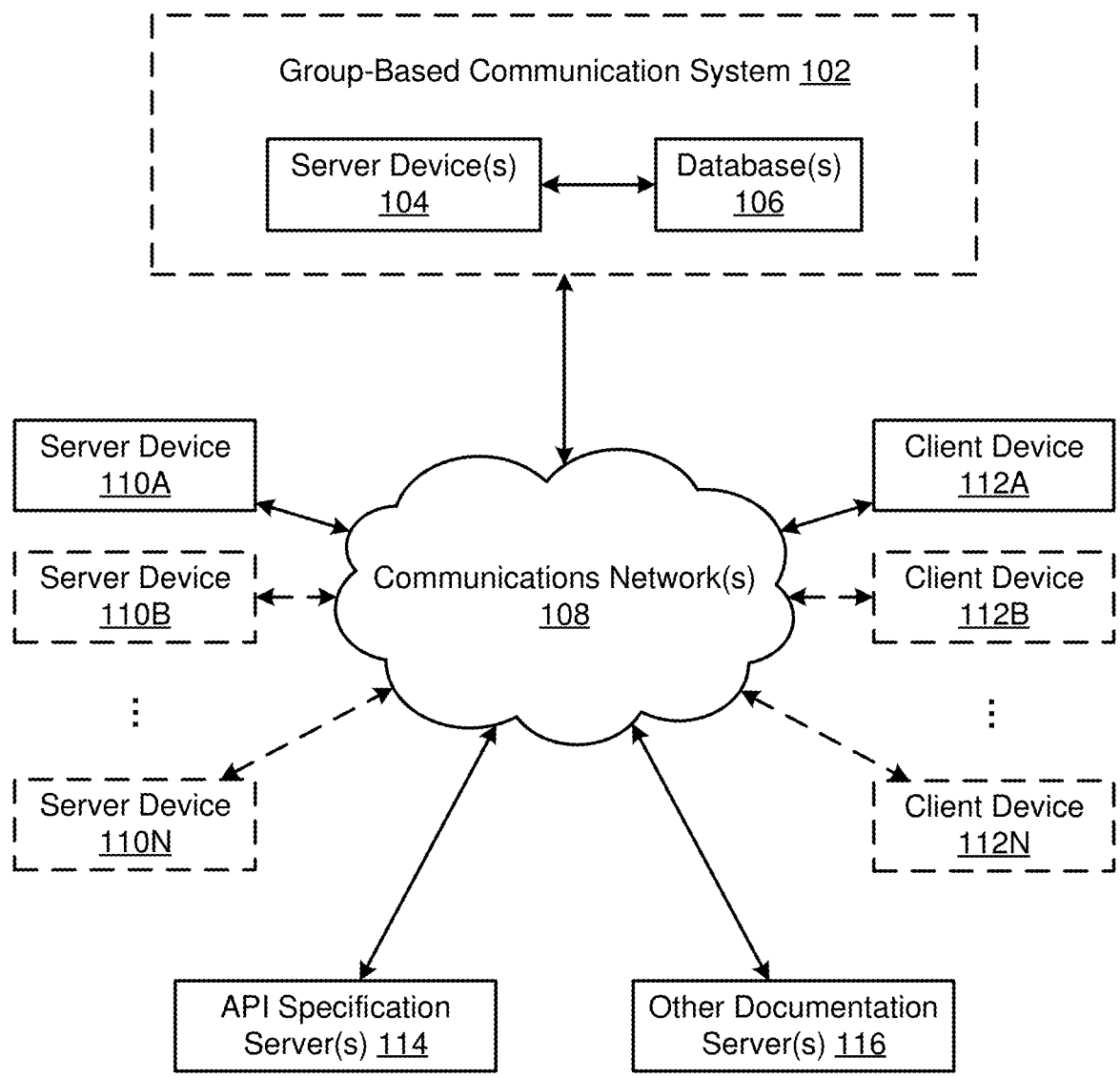
FIG. 1 illustrates a system diagram of a set of devices that may be involved in some example embodiments described herein.

Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, computing systems, computing apparatuses, computer-implemented methods, and computer program products are disclosed herein that solve the above problems by providing improved developer tool functionality in a group-based communication platform interface. In some embodiments, the present disclosure relates to a group-based communication system that provides for inspecting an interface element viewable in a group-based communication platform interface, electronically retrieving documentation in the group-based communication platform interface, providing app-less rendering in the group-based communication platform interface, and combinations thereof.

Interface Element Inspection

In some embodiments, the group-based communication system disclosed herein provides for inspecting an interface element viewable in a group-based communication platform interface. The group-based communication system may be configured to receive an inspect command indicative of a request to perform an inspect action on the interface element viewable in the group-based communication platform interface. The request may have been provided by a user using the client device. The group-based communication system may be further configured to generate an element definition payload based on the inspect command. The group-based communication system may be further configured to generate an inspect action response message comprising the element definition payload. The inspect action response message may comprise the element definition payload. In some instances, the element definition payload may comprise a JavaScript Object Notation (JSON) element definition payload. The JSON element definition payload may comprise type data that defines the interface element, user identification data that defines the interface element, text data that defines the interface element, timestamp data that defines the interface element, any other suitable data, or any combination thereof.

In some embodiments, the group-based communication system may be further configured to generate an ephemeral element definition message based on the inspect action response message. The ephemeral element definition message may be configured to be displayed (e.g., by the client device, a display device in communication with the client device, or both) in the group-based communication platform interface in association with the interface element. For example, the ephemeral element definition message may be configured to be displayed in the group-based communication platform interface as an attachment to the interface element. The group-based communication system may be further configured to transmit, to the client device, the ephemeral element definition message.

In some embodiments, the group-based communication system may be further configured to receive, from the client device, a user interaction event associated with the interface element. The user interaction event may comprise a right click event associated with the interface element; a mouse-over event (e.g., a hover-over event) associated with the interface element; a touch screen event associated with the interface element; a voice command event associated with the interface element; any other suitable user interaction; or any combination thereof. The group-based communication system may be further configured to, in response to receipt of the user interaction event, generate a set of selectable actions comprising a selectable inspect action. The set of selectable actions may be configured to be displayed (e.g., by the client device, a display device in communication with the client device, or both) in the group-based communication platform interface in association with the interface element. For example, the set of selectable actions may be configured to be displayed in a drop down menu box viewable in the group-based communication platform interface in association with the interface element. The group-based communication system may be further configured to transmit, to the client device, the set of selectable actions. The group-based communication system may be further configured to receive, from the client device, electronic information indicative of a selection of the selectable inspect action by the user using the client device. The group-based communication system may be further configured to, in response to receipt of the electronic information indicative of the selection of the selectable inspect action by the user using the client device, generate the inspect command.

In some embodiments, the group-based communication system may be further configured to generate a set of message builder parameters based on the inspect command. The inspect action response message may further comprise the set of message builder parameters. The group-based communication system may be further configured to generate a selectable message builder action configured to be displayed (e.g., by the client device, a display device in communication with the client device, or both) in the group-based communication platform interface in association with the ephemeral element definition message. The group-based communication system may be further configured to transmit, to the client device, the selectable message builder action. The group-based communication system may be further configured to receive, from the client device, electronic information indicative of a selection of the selectable message builder action by the user using the client device. The group-based communication system may be further configured to generate an editable JSON element definition payload based on the element definition payload and the set of message builder parameters. The group-based communication system may be further configured to generate a preview message based on the editable JSON element definition payload. The group-based communication system may be further configured to generate a message builder interface comprising the editable JSON element definition payload and the preview message. The group-based communication system may be further configured to transmit, to the client device, the message builder interface. The message builder interface may be configured to be displayed by the display device.

Documentation Retrieval

In some embodiments, the group-based communication system disclosed herein may further provide for electronically retrieving documentation in a group-based communication platform interface. The group-based communication system to receive a documentation request command indicative of a request for group-based communication platform documentation. The request may have been provided by a user using a client device. The documentation request command may comprise electronic information indicative of a requested API method name. In some embodiments, the request may comprise a command (e.g., a slash command, a documentation command, or both) and the requested API method name, and the group-based communication system may be further configured to, in response to receipt of the request, generate the documentation request command based on the command and the requested API method name.

In some embodiments, the group-based communication system may be further configured to, in response to receipt of the documentation request command, retrieve, from an API specification server, a group-based communication platform API specification comprising a set of group-based communication platform documentation information associated with a set of group-based communication platform documentation API method names. The group-based communication system may be further configured to generate a determination indicative of whether the requested API method name corresponds to any group-based communication platform documentation API method name in the set of group-based communication platform documentation API method names. The group-based communication system may be further configured to generate a documentation response message based on the determination. In some instances, the documentation response message may comprise a JSON documentation payload.

In some embodiments where the requested API method name may be identical to a group-based communication platform API method name in the set of group-based communication platform API method names, the group-based communication system may be further configured to generate a determination indicating that the requested API method name corresponds to the group-based communication platform documentation API method name in the set of group-based communication platform documentation API method names. In such embodiments, the documentation response message may comprise the group-based communication platform documentation information associated with the group-based communication platform documentation API method name.

In some embodiments, the documentation request command may comprise user identification information for the user, and the group-based communication system may be further configured to: generate a group-based communication platform documentation authorization request command comprising the user identification information and the group-based communication platform documentation API method name; in response to the generation of the group-based communication platform documentation authorization request command, generate a group-based communication platform documentation authorization token indicating that the user has authorization to view the group-based communication platform documentation information associated with the group-based communication platform documentation API method name; and in response to the generation of the group-based communication platform documentation authorization token, generate the documentation response message.

In some embodiments where the requested API method name may not be identical to any group-based communication platform API method name in the set of group-based communication platform API method names, the group-based communication system may be further configured to: generate a determination indicating that the requested API method name does not correspond to any group-based communication platform documentation API method name in the set of group-based communication platform documentation API method names; generate a string similarity request comprising the requested API method name and the group-based communication platform API specification; generate a set of semantic similarity scores, wherein each semantic similarity score in the set of semantic similarity scores is a quantitative value indicative of an amount of semantic similarity between the requested API method name and one of the group-based communication platform documentation API method names in the set of group-based communication platform documentation API method names; and generate a set of suggested group-based communication platform API method names based on the set of semantic similarity scores. In such embodiments, the documentation response message may comprise the set of suggested group-based communication platform API method names.

In some embodiments, the group-based communication system may be further configured to generate an ephemeral documentation message based on the documentation response message. The ephemeral documentation message may be configured to be displayed (e.g., by the client device, a display device in communication with the client device, or both) in the group-based communication platform interface in association with the request for the group-based communication platform documentation. For example, the ephemeral documentation message may be configured to be displayed in the group-based communication platform interface as an attachment to the request for the group-based communication platform documentation. The group-based communication system may be further configured to transmit, to the client device, the ephemeral documentation message.

In some embodiments, the documentation request command may be a first documentation request command, the ephemeral documentation message may be a first ephemeral documentation message, and the group-based communication system may be further configured to generate a set of selectable group-based communication platform API method names based on the set of suggested group-based communication platform API method names. The set of selectable group-based communication platform API method names may be configured to be displayed (e.g., by the client device, a display device in communication with the client device, or both) in the group-based communication platform interface in association with the documentation response message. The group-based communication system may be further configured to transmit, to the client device, the set of selectable group-based communication platform API method names. The group-based communication system may be further configured to receive, from the client device, electronic information indicative of a selection of a selectable group-based communication platform API method name by the user using the client device. The group-based communication system may be further configured to, in response to receipt of the electronic information indicative of the selection of the selectable group-based communication platform API method name by the user using the client device, generate a second documentation request command comprising electronic information indicative of the selection of the selectable group-based communication platform API method name by the user using the client device. In some embodiments, the set of selectable group-based communication platform API method names may be configured to be displayed (e.g., by the client device, a display device in communication with the client device, or both) in the group-based communication platform interface as an attachment to the ephemeral documentation message. In some embodiments, the set of selectable group-based communication platform API method names are configured to be displayed in a drop down menu box viewable in the group-based communication platform interface in association with the ephemeral documentation message.

In some embodiments, the group-based communication system may be further configured to generate a second documentation response message based on the selection of the selectable group-based communication platform API method name. The second documentation response message may comprise the group-based communication platform documentation information associated with the selection of the selectable group-based communication platform API method name. In some embodiments, the group-based communication system may be further configured to generate a second ephemeral documentation message based on the second documentation response message. The ephemeral documentation message may be configured to be displayed (e.g., by the client device, a display device in communication with the client device, or both) in the group-based communication platform interface in association with the second documentation request command. The group-based communication system may be further configured to transmit, to the client device, the second ephemeral documentation message.

In some embodiments, the group-based communication system may be further configured to, in response to receipt of the electronic information indicative of the selection of the selectable group-based communication platform API method name by the user using the client device, generate a group-based communication platform interface overlay comprising a set of selectable group-based communication platform API method name confirmation icons. The set of selectable group-based communication platform API method name confirmation icons may comprise a selectable affirmative group-based communication platform API method name confirmation icon and a selectable negative group-based communication platform API method name confirmation icon. The group-based communication platform interface overlay may be configured to be displayed (e.g., by the client device, a display device in communication with the client device, or both) in the group-based communication platform interface as a display screen overlay. The group-based communication system may be further configured to transmit, to the client device, the group-based communication platform interface overlay. The group-based communication system may be further configured to receive, from the client device, electronic information indicative of a selection of the selectable affirmative group-based communication platform API method name confirmation icon by the user using the client device. The group-based communication system may be further configured to, in response to receipt of the electronic information indicative of a selection of the selectable affirmative group-based communication platform API method name confirmation icon by the user using the client device, generate the second documentation request command.

In some embodiments, the group-based communication platform documentation authorization request command may be a first group-based communication platform documentation authorization request command, the group-based communication platform documentation authorization token may be a first group-based communication platform documentation authorization token, the second documentation request command may comprise user identification information for the user, and the group-based communication system may be further configured to: generate a second group-based communication platform documentation authorization request command comprising the user identification information and the selection of the selectable group-based communication platform API method name; in response to the generation of the second group-based communication platform documentation authorization request command, generate a second group-based communication platform documentation authorization token indicating that the user has authorization to view the group-based communication platform documentation information associated with the selection of the selectable group-based communication platform API method name; and in response to the generation of the second group-based communication platform documentation authorization token, generate the second documentation response message.

App-Less Rendering

In some embodiments, the group-based communication system may further provide for providing app-less rendering in a group-based communication platform interface. The group-based communication system may be configured to receive, from a client device, a command indicative of a request to perform an app-less API call in the group-based communication platform. The request may have been provided by a user using the client device. The command may comprise electronic information indicative of a requested API method name and a set of requested call parameters. The group-based communication system may be further configured to generate an app-less API call based on the requested API method name and the set of requested call parameters. The group-based communication system may be further configured to generate a response to the app-less API call. The group-based communication system may be further configured to generate an app-less API call response message based on the command and the response to the app-less API call. In some instances, the app-less API call response message may comprise a call definition payload that defines the command and the response to the app-less API call. The call definition payload that defines the command and the response to the app-less API call may be a JSON call definition payload that defines the command and the response to the app-less API call. The JSON call definition payload may comprise: type data that defines the command; user identification data that defines the command; text data that defines the command; timestamp data that defines the command; type data that defines the response to the app-less API call; API method identification data that defines the response to the app-less API call; text data that defines the response to the app-less API call; timestamp data that defines the response to the app-less API call; any other suitable data, or any combination thereof.

In some embodiments, the group-based communication system may be further configured to generate an ephemeral command response message based on the app-less API call response message. The ephemeral command response message may be configured to be displayed (e.g., by the client device, a display device in communication with the client device, or both) in the group-based communication platform interface in association with the request to perform the app-less API call. For example, the ephemeral command response message may be configured to be displayed in the group-based communication platform interface as an attachment to the request to perform the app-less API call. The interface generation circuitry may be further configured to transmit, to the client device, the ephemeral command response message.

In some embodiments, the group-based communication system may be further configured to generate a set of call builder parameters based on the command, wherein the app-less API call response message further comprises the set of call builder parameters. In some embodiments, the group-based communication system may be further configured to: generate a selectable call builder action configured to be displayed (e.g., by the client device, a display device in communication with the client device, or both) in the group-based communication platform interface in association with the app-less API call response message; transmit, to the client device, the selectable call builder action; receive, from the client device, electronic information indicative of a selection of the selectable call builder action by the user using the client device; and generate an editable JSON call definition payload based on the app-less API call response message and the set of call builder parameters. The group-based communication system may be further configured to generate a call builder interface comprising the editable JSON call definition payload. The group-based communication system may be further configured to transmit, to the client device, the call builder interface, wherein the call builder interface is configured to be displayed by the display device.

In some embodiments, the command may comprise user identification information for the user, and the group-based communication system may be further configured to: generate a group-based communication platform app-less API call authorization request command comprising the user identification information and the response to the app-less API call; in response to the generation of the group-based communication platform app-less API call authorization request command, generate a call authorization token indicating that the user has authorization to view the response to the app-less API call; and in response to the generation of the call authorization token, generate the app-less API call response message.

There are many advantages of these and other embodiments described herein, such as: facilitating a faster, cheaper, and less computing resource and data intensive process for providing improved functionality in a group-based communication platform interface; facilitating user inspection of interface elements viewable in the group-based communication platform interface, facilitating user lookup (e.g., retrieval) of documentation in the group-based communication platform interface; and facilitating app-less rendering in a group-based communication platform interface.

Definitions

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The term "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of zero or more elements. For example, a set may refer to a data structure having zero or more data elements.

As used herein, the terms "data," "data structure," "electronic information," "information," "content," "command," "request," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The terms "circuitry," "module," "utility," and similar terms should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile devices.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g. user group) that the user belongs to. Client devices may include, without limitation, smart phones, tablet computers, laptop computers, desktop computers, wearable devices, personal computers, enterprise computers, and the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user identification information," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an image, an email address, a real name (e.g., John Doe), a username (e.g., jdoe), a password, a real name, a time zone, a status, and the like. The user account details can include a subset designation of user credentials, such as, for example, login information for the user including the user's username and password.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "communication channel" refers to an information route and associated circuitry that is used for data exchange between and among systems and parts of systems. For example, a communication channel may be established between and among various client devices, allowing these client devices to communicate and share data between and among each other. A communication channel identification may be assigned to a communication channel, which indicates the physical address in a database where related data of that communication channel is stored. A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format and attributes of the group-based communication channel may appear differently to different members of the group-based communication channel; however, the content of the group-based communication channel (e.g., messaging communications) may be displayed to each member of the group-based communication channel. For instance, to allow for public viewing as discussed herein, a common set of group-based messaging communications will be displayed to each member of the respective group-based communication channel such that the content of the group-based communication channel (e.g., messaging communications) will not vary per member of the group-based communication channel. In some instances, to allow for one-sided viewing as discussed herein, a separate set of group-based messaging communications will be displayed to each member of one organization in a group-based communication channel but will not be displayed to any member of any other organization in the group-based communication channel.

As used herein, the terms "messaging communication" and "message" refer to any electronically generated digital content object provided by a user using a client device and that is configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

In some embodiments, the group-based communication platform provides for non-transitory "ephemeral" messages. Ephemeral messages refer to messages that are viewable only by client devices associated with the correct identifier. The group-based communication platform provides techniques for receiving, transmitting, storing, and retrieving data with an awareness of: (i) messages that only a particular member may see (e.g., if a member performs an action that results in an error, the group-based communication platform may transmit the message directly to, and only to, that member); (ii) ephemeral messages that are configured to exist (e.g., to be transmitted, viewed, stored, searched, retrieved) on only a subset of members of the group-based communication channel; and (iii) messages that are broadcast to all members of the group-based communication channel.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (e.g., a client device associated with the particular user). These messages may be analyzed to determine context regarding the user (e.g., the user's expertise or interest in a topic may be determined based on the frequency of mention of the topic or key words associated with the topic within such messages).

Group-based communication system users may be organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (e.g., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication platform interface overlay" refers to a display screen overlay configured to be displayed, by a display device, over or adjacent to the group-based communication platform interface. For example, the group-based communication platform interface overlay is configured to be displayed, by the display device in communication with the client device, in the group-based communication platform interface as a display screen overlay.

The term "query" refers to a request associated with a database. A "query" may be generated on one or more client devices, and may be transmitted to a group-based communication platform. A query may be a "select query," which is used to extract data from the database in a readable format according to the query. A query may be an "action query," which asks for operations (such as insertion, deletion, and/or updating) on the data stored in a network database. For example, a "communication channel generation query" is an action query that requests the generation of a communication channel.

The term "event" refers to identifiable, non-transitory occurrence that has technical significance for system hardware and/or software. An event may represent some message, token, count, pattern, value, or marker that can be recognized by a computer system. An application may be triggered to perform certain functions based on the event. For example, in a group-based communication channel, a message sent by a user is an event for applications that utilize the event application programming interface (API). An event may be user-generated, such as keystrokes or mouse movements, or system-generated, such as program loading and errors.

The term "selectable" refers to data or content, such as an icon, that is configured to be selected by a user using a user device. For example, data or content may be selected by the user in response to the user clicking the data or content using a mouse communicatively coupled to the user device, touching the data or content using a touch screen communicatively coupled to the user device, speaking a voice command to select the data or content using a microphone communicatively coupled to the user device, performing any other suitable action, or any combination thereof.

The term "selection" refers to selectable data or content that has been selected by the user using the user device.

The term "determination" refers to an electronic determination relating to particular criteria. In some embodiments, when the particular criteria is satisfied, the determination may be a first text string (e.g., "true"), a first binary number (e.g., "1"), a flag, or any other suitable electronic indication that the criteria is satisfied. In some embodiments, when the particular criteria is not satisfied, the determination may be a second text string (e.g., "false"), a second binary number (e.g., "0"), the lack of a flag, a null value, or any other suitable electronic indication that the criteria is not satisfied.

The term "editable" refers to data or content, such as a JSON payload, that is configured to be modified by a user using a user device. For example, an editable JSON payload may comprise code, text, numbers, or links that be deleted, changed, or added to by a user using a user device.

The term "attachment" refers to data, content, links (e.g., Uniform Resource Locators (URLs)), buttons, drop down menu boxes, interface elements, messages, and other suitable electronic information configured to be displayed in the group-based communication platform interface as an attachment to a message. In some embodiments, an attachment may be a second message may be configured to be displayed in association with a first message (e.g., spatially below the first message). For example, an ephemeral element definition message may configured to be displayed in the group-based communication platform interface as an attachment to the interface element. In another example, an ephemeral documentation message may be configured to be displayed in the group-based communication platform interface as an attachment to the request for the group-based communication platform documentation. In another example, an ephemeral command response message may be configured to be displayed in the group-based communication platform interface as an attachment to the request to perform the app-less API call. In yet another example, a set of selectable group-based communication platform API method names may be configured to be displayed in the group-based communication platform interface as an attachment to the ephemeral documentation message, such as in a drop down menu box viewable in the group-based communication platform interface in association with the ephemeral documentation message.

The term "interface element" refers to a message, icon, image, file, widget, frame, attachment, link, button, drop down menu box, or other interface element of the group-based communication platform interface. In some embodiments, an interface element may be viewable in a group-based communication platform interface.

The term "inspect command" refers to a request or command indicative of a request to perform an inspect action on an interface element viewable in the group-based communication platform interface. In some embodiments, the inspect command may comprise user identification information for the user.

The term "inspect action" refers to an action performed by a user using a user device to inspect an interface element. For example, an inspect action may be included in a set of selectable actions displayed in the group-based communication platform interface in association with the interface element, such as in a drop down menu box viewable in the group-based communication platform interface in association with the interface element.

The term "user interaction event" refers to an interaction with the group-based communication platform interface by a user using a user device. For example, the user interaction event may comprise a right click event associated with an interface element; a mouse-over event associated with an interface element; a touch screen event associated with the interface element; a voice command event associated with the interface element; any other suitable user interaction; or any combination thereof.

The term "element definition payload" refers to a payload that defines an interface element (e.g., the raw JSON data from that interface element). For example, the element definition payload may be a JSON element definition payload comprising type data that defines the interface element, user identification data that defines the interface element, text data that defines the interface element, timestamp data that defines the interface element, any other suitable data, or any combination thereof.

The term "inspect action response message" refers to a message responsive to an inspect command. For example, the inspect action response message may comprise the element definition payload and overhead data (e.g., data associated with transmission of the inspect action response message to a target destination). In some embodiments, an inspect action response message may further comprise the set of message builder parameters.

The term "ephemeral element definition message" refers to an ephemeral message that defines an interface element and that is viewable only by the client device associated with the inspect command. In some embodiments, the ephemeral element definition message is generated based on the inspect action response message. The ephemeral element definition message may be configured to be displayed in the group-based communication platform interface in association with the interface element. For example, the ephemeral element definition message may configured to be displayed in the group-based communication platform interface as an attachment to the interface element.

The term "message builder parameter" refers to parameters used in message builder embodiments described herein. For example, a message builder parameter may refer to a parameter or data that defines an aspect of an interface element (e.g., the raw JSON data from that aspect of the interface element). In some embodiments, a set of message builder parameters for an interface element may comprise type data that defines the interface element, user identification data that defines the interface element, text data that defines the interface element, timestamp data that defines the interface element, any other suitable data, or any combination thereof.

The term "message builder action" refers to an action performed by a user using a user device to edit an editable interface element and view a preview of the edited interface element. For example, a message builder action may be a selectable message builder action displayed in the group-based communication platform interface in association with the ephemeral element definition message, such as a selectable icon viewable in the group-based communication platform interface as an attachment to the ephemeral element definition message.

The term "message builder interface" refers to an interface that allows a user to edit an editable interface element and view preview of the edited interface element. In some embodiments, the message builder interface may be a part of the group-based communication channel interface. In other embodiments, the message builder interface may be a separate interface accessible from the group-based communication channel interface, such as via a selectable link or button whose selection by a user using a user device may form the message builder action.

The term "preview message" refers to a preview of an edited interface element (e.g., an edited JSON element definition payload) viewable in the message builder interface.

The terms "documentation" and "group-based communication platform documentation" refer to electronic documentation relating to the group-based communication platform, such as documentation comprising implementation parameters about a specific API method.

The term "documentation request command" refers to a request or command indicative of a request for group-based communication platform documentation. The request may have been provided by a user using a client device. The documentation request command may comprise electronic information indicative of a requested API method name. In some embodiments, the request may comprise a command (e.g., a slash command, a documentation command, or both) and the requested API method name, and the group-based communication system may be further configured to, in response to receipt of the request, generate the documentation request command based on the command and the requested API method name. In some embodiments, the documentation request command may comprise user identification information for the user.

The terms "API method name," "group-based communication platform API method name," and "suggested group-based communication platform API method name" refer to a unique identifier for a particular API method, such as a text string, a hexadecimal text string, a number, a binary number, a pointer, a link, a cryptonym, or any other suitable identifier. In some embodiments, a user may use a user device to input a requested API method name, which may or may not correspond to a group-based communication platform API method name. For example, the requested API method name may be identical to a group-based communication platform API method name in a set of group-based communication platform API method names included in a group-based communication platform API specification. In another example, the requested API method name may not be identical to any group-based communication platform API method name in the set of group-based communication platform API method names, such as when the requested API method name is misspelled by the user.

The term "group-based communication platform API specification" refers to electronic information relating to the group-based communication platform, such as documentation comprising implementation parameters about a specific API method. For example, the group-based communication platform API specification may comprise a set of group-based communication platform documentation information associated with a set of group-based communication platform API method names, wherein each of the group-based communication platform documentation information is associated with a particular group-based communication platform API method name.

The term "documentation payload" refers to a payload for a documentation response message, such as a JSON documentation payload. In some embodiments, the documentation response message may comprise a JSON documentation payload comprising group-based communication platform documentation information associated with a group-based communication platform documentation API method name. In some embodiments, the group-based communication platform documentation information may be a portion or subset of the group-based communication platform documentation information associated with the group-based communication platform documentation API method name comprised by the group-based communication platform API specification. For example, the group-based communication platform documentation information may be an "API Quick Reference documentation" portion or subset of the group-based communication platform documentation information associated with the group-based communication platform documentation API method name. In some embodiments, the group-based communication platform documentation information may further comprise a selectable documentation icon (e.g., "Read full docs") comprising a link to the entire group-based communication platform documentation information associated with the group-based communication platform API method name.

The term "documentation response message" refers to a message responsive to a documentation request command. For example, the documentation response message may comprise the documentation payload and overhead data (e.g., data associated with transmission of the documentation response message to a target destination).

The term "ephemeral documentation message" refers to an ephemeral message responsive to a documentation request command and that is viewable only by the client device associated with the documentation request command. In some embodiments, the ephemeral documentation message is generated based on the documentation response message. The ephemeral documentation message may be configured to be displayed in the group-based communication platform interface in association with the request for group-based communication platform documentation. For example, the ephemeral documentation message may configured to be displayed in the group-based communication platform interface as an attachment to the request for group-based communication platform documentation.

The term "group-based communication platform documentation authorization request command" refers to a request for a group-based communication platform documentation authorization token indicating that the user has authorization to view the group-based communication platform documentation information associated with the group-based communication platform documentation API method name. The group-based communication platform documentation authorization request command may comprise user identification information for the user and the group-based communication platform documentation API method name.

The term "group-based communication platform documentation authorization token" refers to an electronic token or data structure indicating that the user has authorization to view the group-based communication platform documentation information associated with the group-based communication platform API documentation API method name.

The term "string similarity request" refers to a request to perform a set of string similarity calculation between a requested API method name and a set of group-based communication platform documentation API method names in a group-based communication platform API specification. In some embodiments, the string similarity request may comprise the requested API method name and the group-based communication platform API specification. In some embodiments, the string similarity request may comprise the requested API method name and a link or pointer to the group-based communication platform API specification.

The term "semantic similarity score" refers to a quantitative value indicative of an amount of semantic similarity (e.g., distance) between two text strings. For example, a semantic similarity score may be a quantitative value indicative of an amount of semantic similarity between a requested API method name and one of the group-based communication platform documentation API method names in the set of group-based communication platform documentation API method names. The semantic similarity score may be generated by performing a string similarity calculation using natural language processing techniques, such as string-based semantic similarity techniques, character-based semantic similarity techniques (e.g., longest common substring (LCS), Damerau-Levenshtein, Jaro, Jaro-Winkler, Needleman-Wunsch, Smith-Waterman, N-gram), and term-based semantic similarity techniques (e.g., block distance, cosine similarity, Dice's coefficient, Euclidean distance, Jaccard similarity, matching coefficient, overlap coefficient).

The term "suggested group-based communication platform API method name" refers to a group-based communication platform documentation API method name with a semantic similarity score above a predetermined value (e.g., above or equal to 0.8 on a scale of 0.0 to 1.0) or ranking (e.g., the three highest semantic similarity scores in the set of semantic similarity scores). For example, the suggested group-based communication platform API method name "api.test" may be generated in response to the requested API method name "apites." In another example, the suggested group-based communication platform API method names "chat.postEphemeral" and "chat.postMessage" may be generated in response to the requested API method name "chat.post."

The term "group-based communication platform API method name confirmation icon" refers to a selectable icon indicative of a confirmation or a denial of a selection, by a user using a user device, of a selectable group-based communication platform API method name. For example, the group-based communication platform API method name confirmation icon may be an affirmative group-based communication platform API method name confirmation icon (e.g., "Yes") indicative of a confirmation a selection of a selectable group-based communication platform API method name. Selection of the affirmative group-based communication platform API method name confirmation icon may result in the generation of a documentation request command for the selected group-based communication platform API method name. In another example, the group-based communication platform API method name confirmation icon may be a negative group-based communication platform API method name confirmation icon (e.g., "No") indicative of a denial a selection of a selectable group-based communication platform API method name. Selection of the negative group-based communication platform API method name confirmation icon may not result in the generation of a documentation request command for the selected group-based communication platform API method name. Rather, selection of the negative group-based communication platform API method name confirmation icon may return the group-based communication platform interface to the display of the set of selectable group-based communication platform API method name confirmation icons.

The phrase "command indicative of a request to perform an app-less API call in the group-based communication platform" refers to a command indicative of a request to perform an app-less API call in the group-based communication platform. The request may have been provided by a user using the client device. The command may comprise electronic information indicative of a requested API method name and a set of requested call parameters (e.g., "docs," "test_webhook," "help").

The term "app-less API call" refers to a request to be executed using a particular API that is entered directly into a group-based communication platform interface and invokes a development tool to perform the request using the API. The API call is considered "app-less" because a third party resource developer is provided access to the API using only the development tool and the group-based communication platform interface, and without the third party resource developer having to have created a third party resource to access the API.

The term "response to the app-less API call" refers to raw data received in response to making the app-less API call.

The term "app-less API call response message" refers to a message refers to a message responsive to a command indicative of a request to perform an app-less API call in the group-based communication platform. For example, the app-less API call response message may comprise an app-less API call response payload and overhead data (e.g., data associated with transmission of the app-less API call response message to a target destination). In some embodiments, the app-less API call response message may comprise a call definition payload that defines the command and the response to the app-less API call.

The term "ephemeral command response message" refers to an ephemeral message responsive to a command indicative of a request to perform an app-less API call in the group-based communication platform and that is viewable only by the client device associated with the inspect command. In some embodiments, the ephemeral command response message is generated based on the app-less API call response message. The ephemeral command response message may be configured to be displayed by the client device in the group-based communication platform interface in association with the request to perform the app-less API call. For example, the ephemeral command response message may configured to be displayed in the group-based communication platform interface as an attachment to the request to perform the app-less API call.

The term "call definition payload" refers to a payload that defines the command indicative of a request to perform an app-less API call in the group-based communication platform and the response to the app-less API call (e.g., the raw JSON data from that app-less API call). For example, the call definition payload may be a JSON call definition payload comprising: type data that defines the command; user identification data that defines the command; text data that defines the command; timestamp data that defines the command; type data that defines the response to the app-less API call; API method identification data that defines the response to the app-less API call; text data that defines the response to the app-less API call; timestamp data that defines the response to the app-less API call; any other suitable data, or any combination thereof.

The term "call builder parameter" refers to parameters used in call builder embodiments described herein. For example, a call builder parameter may refer to a parameter or data that defines an aspect of a command indicative of a request to perform an app-less API call in the group-based communication platform and a response to the app-less API call (e.g., the raw JSON data from that aspect of the app-less API call). In some embodiments, a set of call builder parameters for an app-less API call may comprise: type data that defines the command; user identification data that defines the command; text data that defines the command; timestamp data that defines the command; type data that defines the response to the app-less API call; API method identification data that defines the response to the app-less API call; text data that defines the response to the app-less API call; timestamp data that defines the response to the app-less API call; any other suitable data, or any combination thereof.

The term "call builder action" refers to an action performed by a user using a user device to edit an editable app-less API call and view a preview of the edited app-less API call. For example, a call builder action may be a selectable call builder action displayed in the group-based communication platform interface in association with the ephemeral command response message, such as a selectable icon viewable in the group-based communication platform interface as an attachment to the ephemeral command response message.

The term "call builder interface" refers to an interface that allows a user to edit an editable app-less API call and view preview of the edited app-less API call. In some embodiments, the call builder interface may be a part of the group-based communication channel interface. In other embodiments, the call builder interface may be a separate interface accessible from the group-based communication channel interface, such as via a selectable link or button whose selection by a user using a user device may form the call builder action.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more server devices, client devices, remote devices, or a combination thereof. Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, electronic workstation, robot, chatbot, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide group-based communication, such as by providing for inspecting an interface element viewable in a group-based communication platform interface, electronically retrieving documentation in the group-based communication platform interface, providing app-less rendering in a group-based communication platform interface, and combinations thereof. As illustrated, a group-based communication system 102 may be connected to one or more group-based communication server devices 104 in communication with one or more group-based communication databases 106. The group-based communication system 102 may be connected to one or more server devices 110A-110N, one or more client devices 112A-112N, one or more API specification servers 114, and one or more other documentation servers 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof.

The group-based communication system 102 may be embodied as one or more general-purpose or specialized circuitries, processors, memories, computers, or computing systems, or any combination thereof. The group-based communication system 102 may comprise one or more group-based communication server devices 104 and one or more group-based communication databases 106. The one or more group-based communication server devices 104 may be embodied as one or more servers, remote servers, cloud-based servers (e.g., cloud utilities), processors, any other suitable server devices, or any combination thereof. The one or more group-based communication server devices 104 are configured to receive, process, generate, store, and transmit data, signals, and electronic information to facilitate the operations of the group-based communication system 102. The one or more group-based communication databases 106 may be embodied as one or more data storage devices, such as Network Attached Storage (NAS) devices or separate databases or servers. The one or more group-based communication databases 106 are configured to store and provide access to data and information used by the group-based communication system 102 to facilitate the operations of the group-based communication system 102. For example, the one or more group-based communication databases 106 may store user account credentials for users of one or more server devices 110A-110N, one or more client devices 112A-112N, one or more API specification servers 114, one or more other documentation servers 116, or a combination thereof. In another example, the one or more group-based communication databases 106 may store data regarding device characteristics for the one or more server devices 110A-110N, one or more client devices 112A-112N, one or more API specification servers 114, one or more other documentation servers 116, or a combination thereof.

The one or more server devices 110A-110N may be embodied as one or more general-purpose or specialized circuitries, processors, memories, computers, or computing systems, or any combination thereof. In some embodiments, the one or more server devices 110A-110N may be embodied as one or more servers, remote servers, cloud-based servers (e.g., cloud utilities), processors, or any other suitable devices, or any combination thereof. For example, the one or more server devices 110A-110N may be session authentication servers. In some embodiments, the one or more server devices 110A-110N may receive, process, generate, store, and transmit data, signals, and electronic information to facilitate the operations of the group-based communication system 102. Information received by the group-based communication system 102 from one or more server devices 110A-110N may be provided in various forms and via various methods.

The one or more client devices 112A-112N may be embodied as one or more general-purpose or specialized circuitries, processors, memories, computers, or computing systems, or any combination thereof. Information received by the group-based communication system 102 from the one or more client devices 112A-112N may be provided in various forms and via various methods. For example, the one or more client devices 112A-112N may be smartphones, laptop computers, netbooks, tablet computers, wearable devices, desktop computers, electronic workstations, or the like, and the information may be provided through various modes of data transmission provided by these client devices. In some embodiments, the one or more client devices 112A-112N may include or store various data and electronic information associated with one or more users. In some embodiments, the one or more client devices 112A-112N may be associated with one or more users.

In embodiments where a client device 112 is a mobile device, such as a smartphone or tablet, the mobile device may execute a group-based communication "app" (e.g., a thin-client application) to interact with the group-based communication system 102, one or more server devices 110A-110N, one or more API specification servers 114, one or more other documentation servers 116, or a combination thereof. The group-based communication app may be designed to execute on mobile devices, such as tablets or smartphones. For example, the group-based communication app may be configured to execute on mobile device operating systems such as Apple Inc.'s iOS, Google LLC's Android®, or Microsoft Corporation's Windows®. These platforms may provide frameworks that allow the group-based communication app to communicate with other apps and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, API specification servers, other documentation servers). Communication with hardware and software modules executing outside of the group-based communication app may be provided via API circuitry provided by the group-based communication system 102, the mobile device operating system, or both.

The one or more API specification servers 114 may be embodied by any suitable computing device. In some embodiments, the one or more API specification servers 114 may be embodied as one or more data storage devices, such as one or more NAS devices, or as one or more separate databases or database servers. In some embodiments, the one or more API specification servers 114 may be embodied as one or more servers, remote servers, cloud-based servers (e.g., cloud utilities), processors, or any other suitable devices, or any combination thereof. In some embodiments, the one or more API specification servers 114 may receive, process, generate, store, and transmit data, signals, and electronic information to facilitate the operations of the group-based communication system 102. Information received by the group-based communication system 102 from one or more API specification servers 114 may be provided in various forms and via various methods. It will be understood, however, that in some embodiments, the one or more API specification servers 114 need not themselves be databases or database servers, but may be peripheral devices communicatively coupled to databases or database servers.

In some embodiments, the one or more API specification servers 114 may include or store various data and electronic information associated with one or more group-based communication platform API specifications. For example, the one or more API specification servers 114 may include or store a group-based communication platform API specification comprising a set of group-based communication platform documentation information associated with a set of group-based communication platform documentation API method names. In one illustrative example, an API specification server 114 may receive, from the group-based communication system 102 over the one or more communications networks 108, a request for a group-based communication platform API specification; and transmit, to the group-based communication system 102 over the one or more communications networks 108, the group-based communication platform API specification.

The one or more other documentation servers 116 may be embodied by any suitable computing device. In some embodiments, the one or more other documentation servers 116 may be embodied as one or more data storage devices, such as one or more NAS devices, or as one or more separate databases or database servers. In some embodiments, the one or more other documentation servers 116 may be embodied as one or more servers, remote servers, cloud-based servers (e.g., cloud utilities), processors, or any other suitable devices, or any combination thereof. In some embodiments, the one or more other documentation servers 116 may receive, process, generate, store, and transmit data, signals, and electronic information to facilitate the operations of the group-based communication system 102. Information received by the group-based communication system 102 from one or more other documentation servers 116 may be provided in various forms and via various methods. For example, the one or more other documentation servers 116 may include or store various data and electronic information associated with one or more group-based communication platform specifications or documents. It will be understood, however, that in some embodiments, the one or more other documentation servers 116 need not themselves be databases or database servers, but may be peripheral devices communicatively coupled to databases or database servers.

Additionally or alternatively, the one or more server devices 110A-110N, the one or more client devices 112A-112N, the one or more API specification servers 114, the one or more other documentation servers 116, or any combination thereof may interact with the group-based communication system 102 over one or more communications networks 108. As yet another example, the one or more server devices 110A-110N, the one or more client devices 112A-112N, the one or more API specification servers 114, the one or more other documentation servers 116, or a combination thereof may include various hardware or firmware designed to interface with the group-based communication system 102. For example, an example server device 110A may be a session authentication server modified to communicate with the group-based communication system 102, and another example server device 110B may be a purpose-built session authentication server offered for the primary purpose of communicating with the group-based communication system 102. As another example, an example client device 112A may be a user's smartphone and may have an application stored thereon facilitating communication with the group-based communication system 102, whereas another example client device 112B may be a purpose-built device (e.g., a robot comprising a virtual assistant or chatbot) offered for the primary purpose of communicating with the group-based communication system 102.

In some embodiments, the group-based communication system 102 may provide for inspecting an interface element (e.g., message, icon, image, file, widget, frame, or other interface element) viewable in a group-based communication platform interface displayed by a client device 112 or a display device in communication with the client device 112. For example, the group-based communication system 102 may provide for receiving, from the client device 112, an inspect command indicative of a request to perform an inspect action on the interface element viewable in the group-based communication platform interface. The request may have been provided by a user using the client device 112. The group-based communication system 102 may further provide for generating an element definition payload based on the inspect command. The group-based communication system 102 may further provide for generating an inspect action response message comprising the element definition payload. The group-based communication system 102 may further provide for generating an ephemeral element definition message based on the inspect action response message. The ephemeral element definition message may be configured to be displayed, by the client device 112 or a display device in communication with the client device 112, in the group-based communication platform interface in association with the interface element. The group-based communication system 102 may further provide for transmitting, to the client device 112, the ephemeral element definition message.

In some embodiments, the group-based communication system 102 may provide for electronically retrieving documentation in a group-based communication platform interface displayed by a client device 112 or a display device in communication with the client device 112. The group-based communication system 102 may provide for receiving, from a client device 112, a documentation request command indicative of a request for group-based communication platform documentation. The request may have been provided by a user using the client device 112. The documentation request command may comprise electronic information indicative of a requested API method name. The group-based communication system 102 may further provide for, in response to receiving the documentation request command, retrieving, from an API specification server 114, a group-based communication platform API specification comprising a set of group-based communication platform documentation information associated with a set of group-based communication platform documentation API method names. The group-based communication system 102 may further provide for determining whether the requested API method name corresponds to any group-based communication platform documentation API method name in the set of group-based communication platform documentation API method names. The group-based communication system 102 may further provide for generating a documentation response message based on the determination of whether the requested API method name corresponds to any group-based communication platform documentation API method name in the set of group-based communication platform documentation API method names. The group-based communication system 102 may further provide for generating an ephemeral documentation message based on the documentation response message. The ephemeral documentation message may be configured to be displayed, by the client device 112 or a display device in communication with the client device 112, in the group-based communication platform interface in association with the request for the group-based communication platform documentation. The group-based communication system 102 may further provide for transmitting, to the client device 112, the ephemeral documentation message.

In some embodiments, the group-based communication system 102 may provide for providing app-less rendering in a group-based communication platform interface displayed by a client device 112 or a display device in communication with the client device 112. The group-based communication system 102 may provide for receiving, from a client device 112, a command indicative of a request to perform an app-less API call in the group-based communication platform. The request may have been provided by a user using the client device 112. The command may comprise electronic information indicative of a requested API method name and a set of requested call parameters. The group-based communication system 102 may further provide for generating an app-less API call based on the requested API method name and the set of requested call parameters. The group-based communication system 102 may further provide for generating a response to the app-less API call. The group-based communication system 102 may further provide for generating an app-less API call response message based on the command and the response to the app-less API call. The group-based communication system 102 may further provide for generating an ephemeral command response message based on the app-less API call response message. The ephemeral command response message may be configured to be displayed by the client device 112 or a display device in communication with the client device 112, in the group-based communication platform interface in association with the request to perform the app-less API call. The group-based communication system 102 may further provide for transmitting, to the client device 112, the ephemeral command response message.

Example Implementing Apparatus

Figure 2:
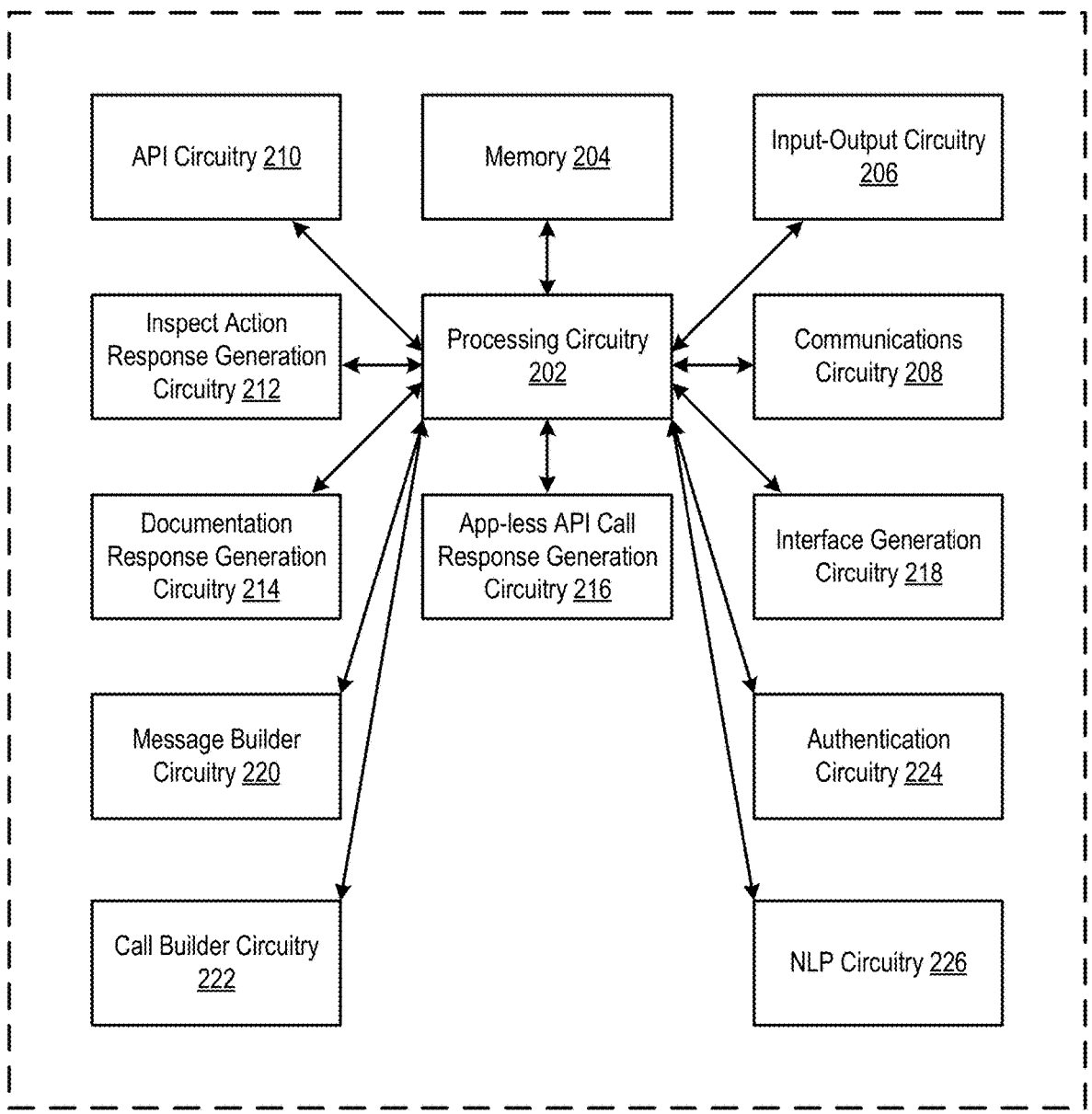
FIG. 2 illustrates a schematic block diagram of example circuitry that may perform various operations in accordance with some example embodiments described herein.

The group-based communication system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226. The apparatus 200 may be configured to execute the operations described above with respect to FIG. 1 and below with respect to FIGS. 3-8. Although some of these components 202-226 are described with respect to their functional capabilities, it should be understood that the particular implementations necessarily include the use of particular hardware to implement such functional capabilities. It should also be understood that certain of these components 202-226 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory may be an electronic storage device (e.g., a computer readable storage medium). The memory 204 may be configured to store electronic information, data, content, applications, instructions, or the like, for enabling the apparatus to carry out various functions in accordance with example embodiments of the present disclosure.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionality and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a request or command provided by a user using a client device (e.g., client device 112). The input-output circuitry 206 may comprise a group-based communication platform interface (e.g., a group-based communication platform interface generated by interface generation circuitry 218) comprising a display that may include a web interface, a mobile application, a display screen, a display screen overlay (e.g., a group-based communication platform interface overlay), or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more group-based communication platform interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate (e.g., by interface generation circuitry 218) group-based communication platform interface data for display by one or more other client devices with which one or more users directly interact and transmit the generated group-based communication platform interface data to one or more of those client devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The API circuitry 210 includes hardware components designed or configured to request, receive, process, generate, store, and transmit data, data structures, control signals, and electronic information for use in group-based communication. In some embodiments, the API circuitry 210 may be configured to receive, from the interface generation circuitry 218, an inspect command indicative of a request to perform an inspect action on the interface element viewable in the group-based communication platform interface. The request may have been provided by a user using a client device (e.g., client device 112). The API circuitry 210 may be further configured to transmit, to the inspect action response generation circuitry 212, the inspect command. The API circuitry 210 may be further configured to receive, from the inspect action response generation circuitry 212, an inspect action response message comprising an element definition payload. The API circuitry 210 may be further configured to transmit, to the interface generation circuitry 218, the inspect action response message.

In some embodiments, the API circuitry 210 may be configured to receive, from the interface generation circuitry 218, a documentation request command indicative of a request for group-based communication platform documentation. The request may have been provided by a user using a client device (e.g., client device 112). The documentation request command may comprise electronic information indicative of a requested API method name. The API circuitry 210 may be further configured to transmit, to the documentation response generation circuitry 214, the documentation request command. The API circuitry 210 may be further configured to receive, from the documentation response generation circuitry 214, a documentation response message. The API circuitry may be further configured to transmit, to the interface generation circuitry 218, the documentation response message.

In some embodiments, the API circuitry 210 may be configured to receive, from the interface generation circuitry 218, a command indicative of a request to perform an app-less API call in the group-based communication platform. The request may have been provided by a user using a client device (e.g., client device 112). The command may comprise electronic information indicative of a requested API method name and a set of requested call parameters. The API circuitry 210 may be further configured to transmit, to the app-less API call response generation circuitry 216, the command. The API circuitry 210 may be further configured to receive, from the app-less API call response generation circuitry 216, an app-less API call. The API circuitry 210 may be further configured to generate a response to the app-less API call. The API circuitry 210 may be further configured to transmit, to the app-less API call response generation circuitry 216, the response to the app-less API call. The API circuitry 210 may be further configured to receive, from the app-less API call response generation circuitry 216, an app-less API call response message. The API circuitry 210 may be further configured to transmit, to the interface generation circuitry 218, the app-less API call response message.

The inspect action response generation circuitry 212 includes hardware components designed or configured to request, receive, process, generate, store, and transmit data, data structures, control signals, and electronic information for use in group-based communication. In some embodiments, the inspect action response generation circuitry 212 may be configured to receive, from the API circuitry 210, the inspect command. The inspect action response generation circuitry 212 may be further configured to generate an element definition payload based on the inspect command. The inspect action response generation circuitry 212 may be further configured to generate an inspect action response message comprising the element definition payload. In some embodiments, the element definition payload may comprise a JSON element definition payload. The JSON element definition payload may comprise type data that defines the interface element, user identification data that defines the interface element, text data that defines the interface element, timestamp data that defines the interface element, any other suitable data, or any combination thereof. In some embodiments, the inspect action response generation circuitry 212 may be further configured to generate a set of message builder parameters based on the inspect command.

The inspect action response message may further comprise the set of message builder parameters. The inspect action response generation circuitry 212 may be further configured to transmit, to the API circuitry 210, the inspect action response message.

The documentation response generation circuitry 214 includes hardware components designed or configured to request, receive, process, generate, store, and transmit data, data structures, control signals, and electronic information for use in group-based communication. In some embodiments, the documentation response generation circuitry 214 may be configured to receive, from the API circuitry 210, the documentation request command. The documentation response generation circuitry 214 may be further configured to, in response to receipt of the documentation request command, retrieve, from an API specification server (e.g., API specification server 114), a group-based communication platform API specification comprising a set of group-based communication platform documentation information associated with a set of group-based communication platform documentation API method names. The documentation response generation circuitry 214 may be further configured to generate a determination indicative of whether the requested API method name corresponds to any group-based communication platform documentation API method name in the set of group-based communication platform documentation API method names. The documentation response generation circuitry 214 may be further configured to generate a documentation response message based on the determination. In some embodiments, the documentation response message may comprise a JSON documentation payload. The documentation response generation circuitry 214 may be further configured to transmit, to the API circuitry 210, the documentation response message.

In some embodiments, the requested API method name may be identical to a group-based communication platform API method name in the set of group-based communication platform API method names. In such embodiments, the documentation response generation circuitry 214 may be further configured to generate a determination indicating that the requested API method name corresponds to the group-based communication platform documentation API method name in the set of group-based communication platform documentation API method names. The documentation response message may comprise the group-based communication platform documentation information associated with the group-based communication platform documentation API method name.

In some embodiments, the documentation request command may comprise user identification information for the user, and the documentation response generation circuitry 214 may be further configured to: generate a group-based communication platform documentation authorization request command comprising the user identification information and the group-based communication platform documentation API method name; transmit, to authentication circuitry 224 in communication with the documentation response generation circuitry 214, the group-based communication platform documentation authorization request command; receive, from the authentication circuitry 224, a group-based communication platform documentation authorization token indicating that the user has authorization to view the group-based communication platform documentation information associated with the group-based communication platform documentation API method name; and in response to receipt of the group-based communication platform documentation authorization token, generate the documentation response message.

In some embodiments, the requested API method name may not be identical to any group-based communication platform API method name in the set of group-based communication platform API method names. In such embodiments, the documentation response generation circuitry 214 may be further configured to: generate a determination indicating that the requested API method name does not correspond to any group-based communication platform documentation API method name in the set of group-based communication platform documentation API method names; transmit, to NLP circuitry 226 in communication with the documentation response generation circuitry 214, a string similarity request comprising the requested API method name and the group-based communication platform API specification; and receive, from the NLP circuitry 226, a set of suggested group-based communication platform API method names, wherein the documentation response message comprises the set of suggested group-based communication platform API method names.

In some embodiments, the documentation response message may be a first documentation response message, and the API circuitry 210 may be further configured to: receive, from the interface generation circuitry 218, a second documentation request command; transmit, to the documentation response generation circuitry 214, the second documentation request command; receive, from the documentation response generation circuitry 214, a second documentation response message; and transmit, to the interface generation circuitry 218, the second documentation response message. In some embodiments, the documentation response generation circuitry 214 may be further configured to receive, from the API circuitry 210, the second documentation request command; generate the second documentation response message based on the selection of the selectable group-based communication platform API method name, wherein the second documentation response message comprises the group-based communication platform documentation information associated with the selection of the selectable group-based communication platform API method name; and transmit, to the API circuitry 210, the second documentation response message.

In some embodiments, the second documentation request command may comprise user identification information for the user, and the documentation response generation circuitry 214 may be further configured to: generate a group-based communication platform documentation authorization request command comprising the user identification information and the selection of the selectable group-based communication platform API method name; transmit, to authentication circuitry 224 in communication with the documentation response generation circuitry 214, the group-based communication platform documentation authorization request command; receive, from the authentication circuitry 224, a group-based communication platform documentation authorization token indicating that the user has authorization to view the group-based communication platform documentation information associated with the selection of the selectable group-based communication platform API method name; and in response to receipt of the group-based communication platform documentation authorization token, generate the second documentation response message.

The app-less API call response generation circuitry 216 includes hardware components designed or configured to request, receive, process, generate, store, and transmit data, data structures, control signals, and electronic information for use in group-based communication. In some embodiments, the app-less API call response generation circuitry 216 may be configured to receive, from the API circuitry 210, the command. The app-less API call response generation circuitry 216 may be further configured to generate an app-less API call based on the requested API method name and the set of requested call parameters. The app-less API call response generation circuitry 216 may be further configured to transmit, to the API circuitry 210, the app-less API call. The app-less API call response generation circuitry 216 may be further configured to receive from the API circuitry 210, a response to the app-less API call. The app-less API call response generation circuitry 216 may be further configured to generate an app-less API call response message based on the command and the response to the app-less API call. The app-less API call response message may comprise a call definition payload that defines the command and the response to the app-less API call. The call definition payload that defines the command and the response to the app-less API call may be a JSON call definition payload that defines the command and the response to the app-less API call. The JSON call definition payload may comprise: type data that defines the command; user identification data that defines the command; text data that defines the command; timestamp data that defines the command; type data that defines the response to the app-less API call; API method identification data that defines the response to the app-less API call; text data that defines the response to the app-less API call; timestamp data that defines the response to the app-less API call; any other suitable data, or any combination thereof. The app-less API call response generation circuitry 216 may be further configured to transmit, to the API circuitry, the app-less API call response message.

In some embodiments, the app-less API call response generation circuitry 216 may be further configured to generate a set of call builder parameters based on the command. In such embodiments, the app-less API call response message may further comprise the set of call builder parameters.

In some embodiments, the command may comprise user identification information for the user, and the app-less API call response generation circuitry 216 may be further configured to: generate a group-based communication platform app-less API call authorization request command comprising the user identification information and the response to the app-less API call; transmit, to authentication circuitry 224 in communication with the app-less API call response generation circuitry 216, the group-based communication platform app-less API call authorization request command; receive, from the authentication circuitry 224, a call authorization token indicating that the user has authorization to view the response to the app-less API call; and in response to receipt of the call authorization token, generate the app-less API call response message.

The interface generation circuitry 218 includes hardware components designed or configured to request, receive, process, generate, store, and transmit data, data structures, control signals, and electronic information for use in group-based communication. In some embodiments, the interface generation circuitry 218 may be configured to generate group-based communication platform interface data configured to be displayed by a display device. For example, the interface generation circuitry 218 may be configured to generate group-based communication platform interface data (including, but not limited to, ephemeral messages) and transmit the generated group-based communication platform interface data to the input-output circuitry 206, and the input-output circuitry 206 may be configured to receive the group-based communication platform interface data and display the received group-based communication platform interface data on one or more display screens. In some embodiments, the interface generation circuitry 218 may include hardware components designed or configured to generate group-based communication platform interface data based on any embodiment or combination of embodiments described with reference to FIGS. 1-8.

In some embodiments, the interface generation circuitry 218 may be configured to receive, from the API circuitry 210, the inspect action response message. The interface generation circuitry 218 may be configured to generate an ephemeral element definition message based on the inspect action response message. The ephemeral element definition message may be configured to be displayed (e.g., by the client device, a display device in communication with the client device, or both) in the group-based communication platform interface in association with the interface element. For example, the ephemeral element definition message may configured to be displayed in the group-based communication platform interface as an attachment to the interface element. The interface generation circuitry 218 may be configured to transmit, to the client device, the ephemeral element definition message.

In some embodiments, the interface generation circuitry 218 may be further configured to receive, from the client device, a user interaction event associated with the interface element. The user interaction event may comprise a right click event associated with the interface element; a mouseover event associated with the interface element; a touch screen event associated with the interface element; a voice command event associated with the interface element; any other suitable user interaction; or any combination thereof. The interface generation circuitry 218 may be further configured to, in response to receipt of the user interaction event, generate a set of selectable actions comprising a selectable inspect action. The set of selectable actions may be configured to be displayed (e.g., by the client device, a display device in communication with the client device, or both) in the group-based communication platform interface in association with the interface element. For example, the set of selectable actions may be configured to be displayed in a drop down menu box viewable in the group-based communication platform interface in association with the interface element. The interface generation circuitry 218 may be further configured to transmit, to the client device, the set of selectable actions. The interface generation circuitry 218 may be further configured to receive, from the client device, electronic information indicative of a selection of the selectable inspect action by the user using the client device. The interface generation circuitry 218 may be further configured to, in response to receipt of the electronic information indicative of the selection of the selectable inspect action by the user using the client device, generate the inspect command. The interface generation circuitry 218 may be further configured to transmit, to the API circuitry 210, the inspect command.

In some embodiments, the interface generation circuitry 218 may be further configured to generate a selectable message builder action configured to be displayed (e.g., by the client device, a display device in communication with the client device, or both) in the group-based communication platform interface in association with the ephemeral element definition message. The interface generation circuitry 218 may be further configured to transmit, to the client device, the selectable message builder action. The interface generation circuitry 218 may be further configured to receive, from the client device, electronic information indicative of a selection of the selectable message builder action by the user using the client device. The interface generation circuitry 218 may be further configured to, in response to receipt of the electronic information indicative of the selection of the selectable message builder action by the user using the client device, transmit, to message builder circuitry 220 in communication with the interface generation circuitry 218, the element definition payload and the set of message builder parameters.

In some embodiments, the interface generation circuitry 218 may be further configured to receive, from the API circuitry, the documentation response message. The interface generation circuitry may be further configured to generate an ephemeral documentation message based on the documentation response message. The ephemeral documentation message may be configured to be displayed (e.g., by the client device, a display device in communication with the client device, or both) in the group-based communication platform interface in association with the request for the group-based communication platform documentation. For example, the ephemeral documentation message may be configured to be displayed in the group-based communication platform interface as an attachment to the request for the group-based communication platform documentation. The interface generation circuitry 218 may be further configured to transmit, to the client device, the ephemeral documentation message.

In some embodiments, the documentation request command may be a first documentation request command, the ephemeral documentation message may be a first ephemeral documentation message, and the interface generation circuitry 218 may be further configured to: generate a set of selectable group-based communication platform API method names based on the set of suggested group-based communication platform API method names, wherein the set of selectable group-based communication platform API method names is configured to be displayed (e.g., by the client device, a display device in communication with the client device, or both) in the group-based communication platform interface in association with the documentation response message; transmit, to the client device, the set of selectable group-based communication platform API method names; receive, from the client device, electronic information indicative of a selection of a selectable group-based communication platform API method name by the user using the client device; in response to receipt of the electronic information indicative of the selection of the selectable group-based communication platform API method name by the user using the client device, generate a second documentation request command comprising electronic information indicative of the selection of the selectable group-based communication platform API method name by the user using the client device; and transmit, to the API circuitry 210, the second documentation request command. In some embodiments, the set of selectable group-based communication platform API method names may be configured to be displayed (e.g., by the client device, a display device in communication with the client device, or both) in the group-based communication platform interface as an attachment to the ephemeral documentation message. For example, the set of selectable group-based communication platform API method names may be configured to be displayed in a drop down menu box viewable in the group-based communication platform interface in association with the ephemeral documentation message.

In some embodiments, the interface generation circuitry 218 may be further configured to: receive, from the API circuitry 210, the second documentation response message; generate a second ephemeral documentation message based on the second documentation response message, wherein the ephemeral documentation message is configured to be displayed (e.g., by the client device, a display device in communication with the client device, or both) in the group-based communication platform interface in association with the second documentation request command; and transmit, to the client device, the second ephemeral documentation message.

In some embodiments, the interface generation circuitry 218 may be further configured to, in response to receipt of the electronic information indicative of the selection of the selectable group-based communication platform API method name by the user using the client device, generate a group-based communication platform interface overlay comprising a set of selectable group-based communication platform API method name confirmation icons. The set of selectable group-based communication platform API method name confirmation icons may comprise a selectable affirmative group-based communication platform API method name confirmation icon and a selectable negative group-based communication platform API method name confirmation icon. The group-based communication platform interface overlay may be configured to be displayed (e.g., by the client device, a display device in communication with the client device, or both) in the group-based communication platform interface as a display screen overlay. The interface generation circuitry 218 may be further configured to transmit, to the client device, the group-based communication platform interface overlay. The interface generation circuitry 218 may be further configured to receive, from the client device, electronic information indicative of a selection of the selectable affirmative group-based communication platform API method name confirmation icon by the user using the client device. The interface generation circuitry 218 may be further configured to, in response to receipt of the electronic information indicative of a selection of the selectable affirmative group-based communication platform API method name confirmation icon by the user using the client device, generate the second documentation request command. The interface generation circuitry 218 may be further configured to transmit, to the API circuitry 210, the second documentation request command.

In some embodiments, the interface generation circuitry 218 may be further configured to: receive, from the client device, the request for the group-based communication platform documentation, wherein the request comprises a command (e.g., a slash command, a documentation command, or both) and the requested API method name; in response to receipt of the request, generate the documentation request command based on the command and the requested API method name; and transmit, to the API circuitry 210, the documentation request command.

In some embodiments, the interface generation circuitry 218 may be further configured to receive, from the API circuitry 210, the app-less API call response message. The interface generation circuitry 218 may be further configured to generate an ephemeral command response message based on the app-less API call response message, wherein the ephemeral command response message is configured to be displayed (e.g., by the client device, a display device in communication with the client device, or both) in the group-based communication platform interface in association with the request to perform the app-less API call. For example, the ephemeral command response message may be configured to be displayed in the group-based communication platform interface as an attachment to the request to perform the app-less API call. The interface generation circuitry 218 may be further configured to transmit, to the client device, the ephemeral command response message.

In some embodiments, the interface generation circuitry 218 may be further configured to: generate a selectable call builder action configured to be displayed (e.g., by the client device, a display device in communication with the client device, or both) in the group-based communication platform interface in association with the app-less API call response message; transmit, to the client device, the selectable call builder action; receive, from the client device, electronic information indicative of a selection of the selectable call builder action by the user using the client device; and in response to receipt of the electronic information indicative of the selection of the selectable call builder action by the user using the client device, transmit, to call builder circuitry 222 in communication with the interface generation circuitry 218, the app-less API call response message and the set of call builder parameters.

The message builder circuitry 220 includes hardware components designed or configured to request, receive, process, generate, store, and transmit data, data structures, control signals, and electronic information for use in group-based communication. In some embodiments, the message builder circuitry 220 may be configured to receive, from the interface generation circuitry 218, the element definition payload and the set of message builder parameters. The message builder circuitry 220 may be further configured to generate an editable JSON element definition payload based on the element definition payload and the set of message builder parameters. The message builder circuitry 220 may be further configured to generate a preview message based on the editable JSON element definition payload. The message builder circuitry 220 may be further configured to generate a message builder interface comprising the editable JSON element definition payload and the preview message. The message builder circuitry 220 may be further configured to transmit, to a client device (e.g., client device 112), the message builder interface. The message builder interface may be configured to be displayed by the client device or by a display device in communication with the client device.

The call builder circuitry 222 includes hardware components designed or configured to request, receive, process, generate, store, and transmit data, data structures, control signals, and electronic information for use in group-based communication. In some embodiments, the call builder circuitry 222 may be configured to receive, from the interface generation circuitry 218, the app-less API call response message and the set of call builder parameters. The call builder circuitry 222 may be further configured to generate an editable JSON call definition payload based on the app-less API call response message and the set of call builder parameters. The call builder circuitry 222 may be further configured to generate a call builder interface comprising the editable JSON call definition payload. The call builder circuitry 222 may be further configured to transmit, to the client device (e.g., client device 112), the call builder interface. The call builder interface may be configured to be displayed by the client device or a display device in communication with the client device.

The authentication circuitry 224 includes hardware components designed or configured to request, receive, process, generate, store, and transmit data, data structures, control signals, and electronic information for use in group-based communication. In some embodiments, the authentication circuitry 224 may be configured to receive, from the documentation response generation circuitry 214, the group-based communication platform documentation authorization request command comprising the user identification information and the group-based communication platform documentation API method name; generate a group-based communication platform documentation authorization token indicating that the user has authorization to view the group-based communication platform documentation information associated with the group-based communication platform documentation API method name; and transmit, to the documentation response generation circuitry 214, the group-based communication platform documentation authorization token.

In some embodiments, the authentication circuitry 224 may be configured to receive, from the app-less API call response generation circuitry 216, the group-based communication platform app-less API call authorization request command comprising the user identification information and the response to the app-less API call; generate a call authorization token indicating that the user has authorization to view the response to the app-less API call; transmit, to the app-less API call response generation circuitry 216, the call authorization token.

The NLP circuitry 226 includes hardware components designed or configured to request, receive, process, generate, store, and transmit data, data structures, control signals, and electronic information for use in group-based communication. In some embodiments, the NLP circuitry 226 may be configured to receive, from the documentation response generation circuitry 214, the string similarity request. The NLP circuitry 226 may be further configured to generate a set of semantic similarity scores, wherein each semantic similarity score in the set of semantic similarity scores is a quantitative value indicative of an amount of semantic similarity between the requested API method name and one of the group-based communication platform documentation API method names in the set of group-based communication platform documentation API method names. The NLP circuitry 226 may be further configured to generate the set of suggested group-based communication platform API method names based on the set of semantic similarity scores. The NLP circuitry 226 may be further configured to transmit, to the documentation response generation circuitry 214, the set of suggested group-based communication platform API method names.

It should also be appreciated that, in some embodiments, each of the API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226 may include a separate processor, specially configured field programmable gate array (FPGA), application specific interface circuit (ASIC), or cloud utility to perform the above functions.

In some embodiments, the hardware components described above with reference to API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226, may, for instance, utilize communications circuitry 208 or any suitable wired or wireless communications path to communicate with a server device (e.g., one or more of server devices 110A-110N), a client device (e.g., one or more of client devices 112A-112N), an API specification server (e.g., one or more of API specification servers 114), a documentation server (e.g., one or more of other documentation servers 116), processing circuitry 202, memory 204, input-output circuitry 206, communications circuitry 208 (e.g., the communications circuitry 208 of a second apparatus implementing one or more portions of apparatus 200), each other, or any other suitable circuitry or device.

In some embodiments, one or more of the API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226 may be hosted locally by the apparatus 200. In some embodiments, one or more of the API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-executable program code instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The one or more server devices 110A-110N, one or more client devices 112A-112N, one or more API specification servers 114, and one or more other documentation servers 116 may be embodied by one or more computing devices or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile group-based communication platform app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the group-based communication system described herein.

Figure 3A:
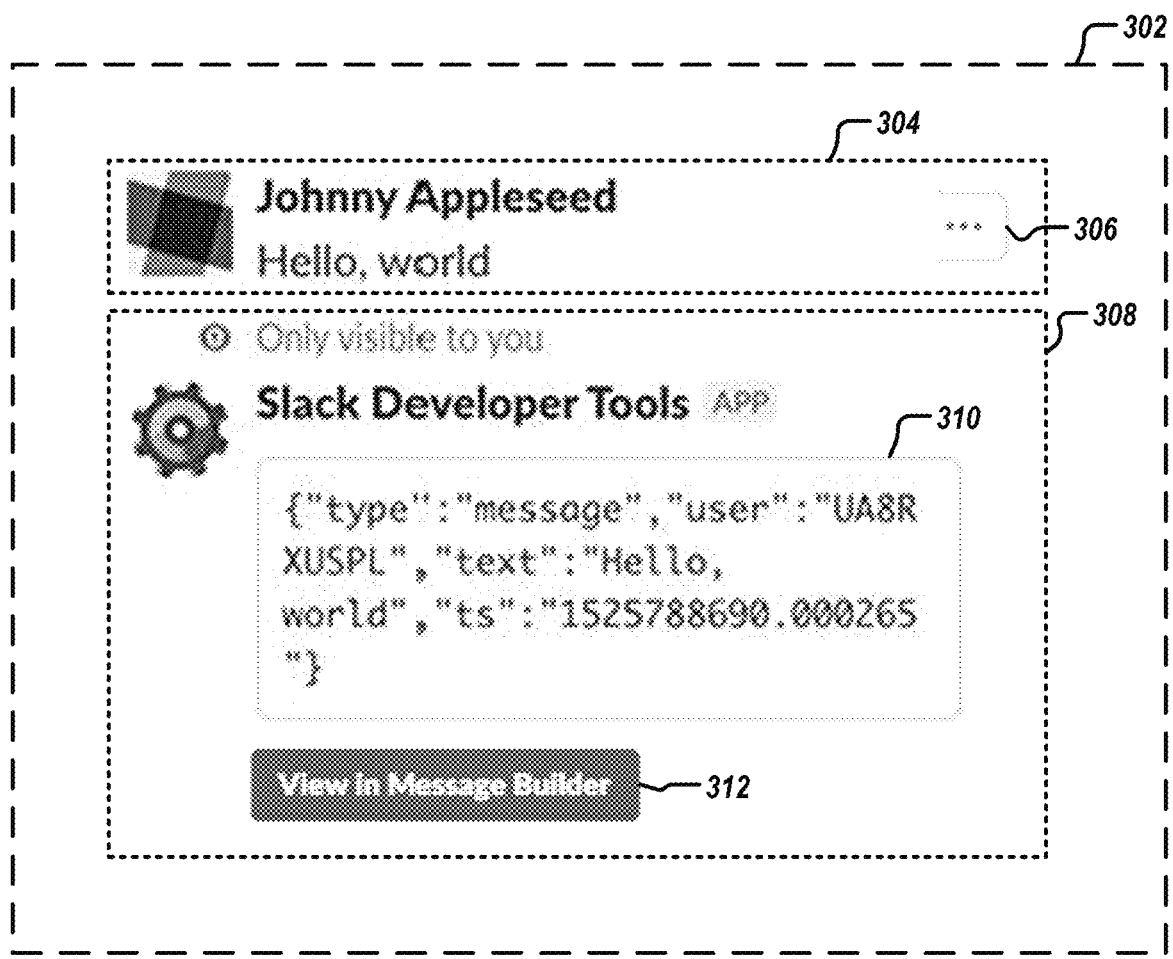
FIGS. 3A, 3B, and 3C illustrate example data structures for inspecting an interface element viewable in a group-based communication platform interface in accordance with some example embodiments described herein.
Figure 3B:
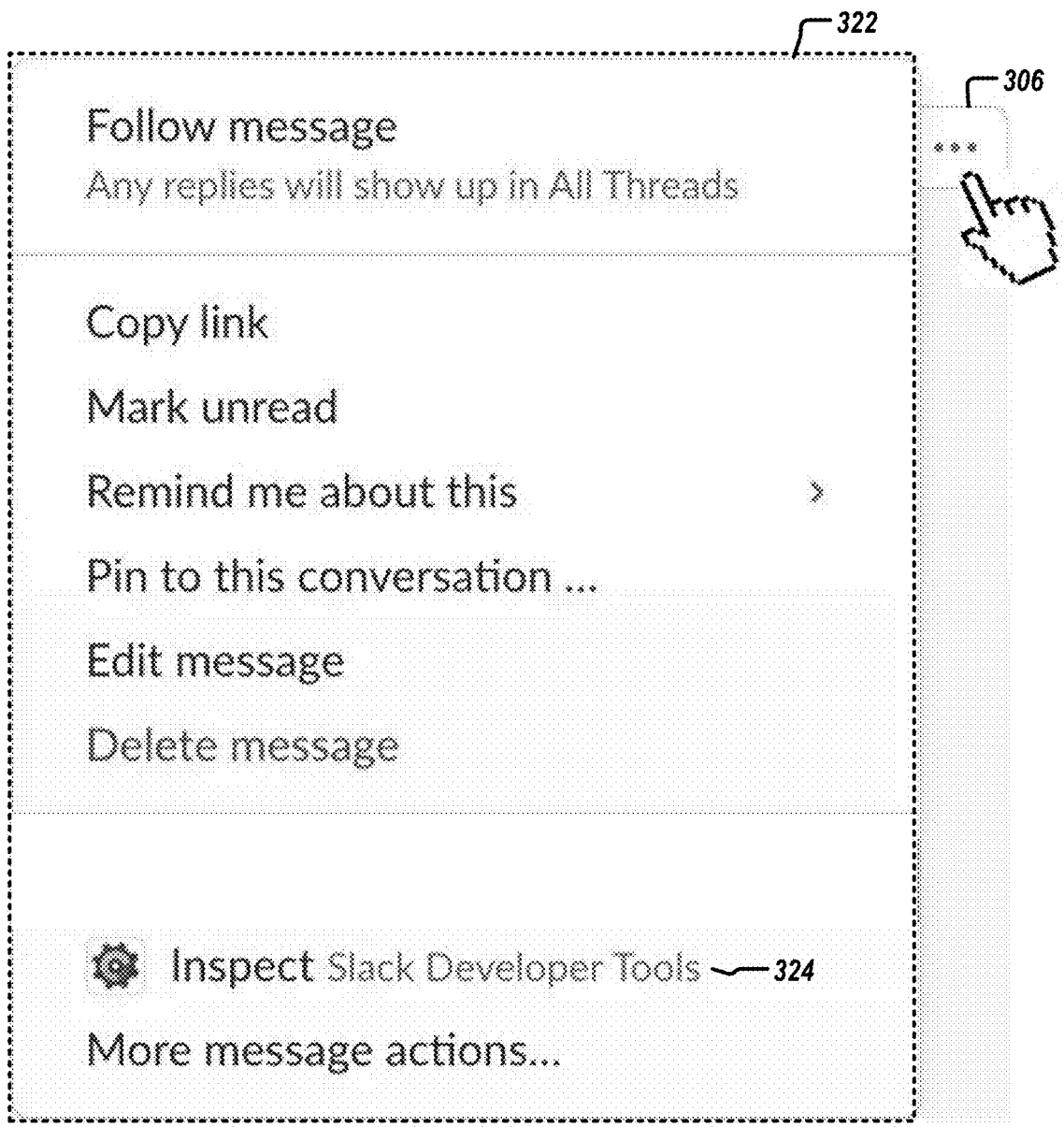
Figure 3C:
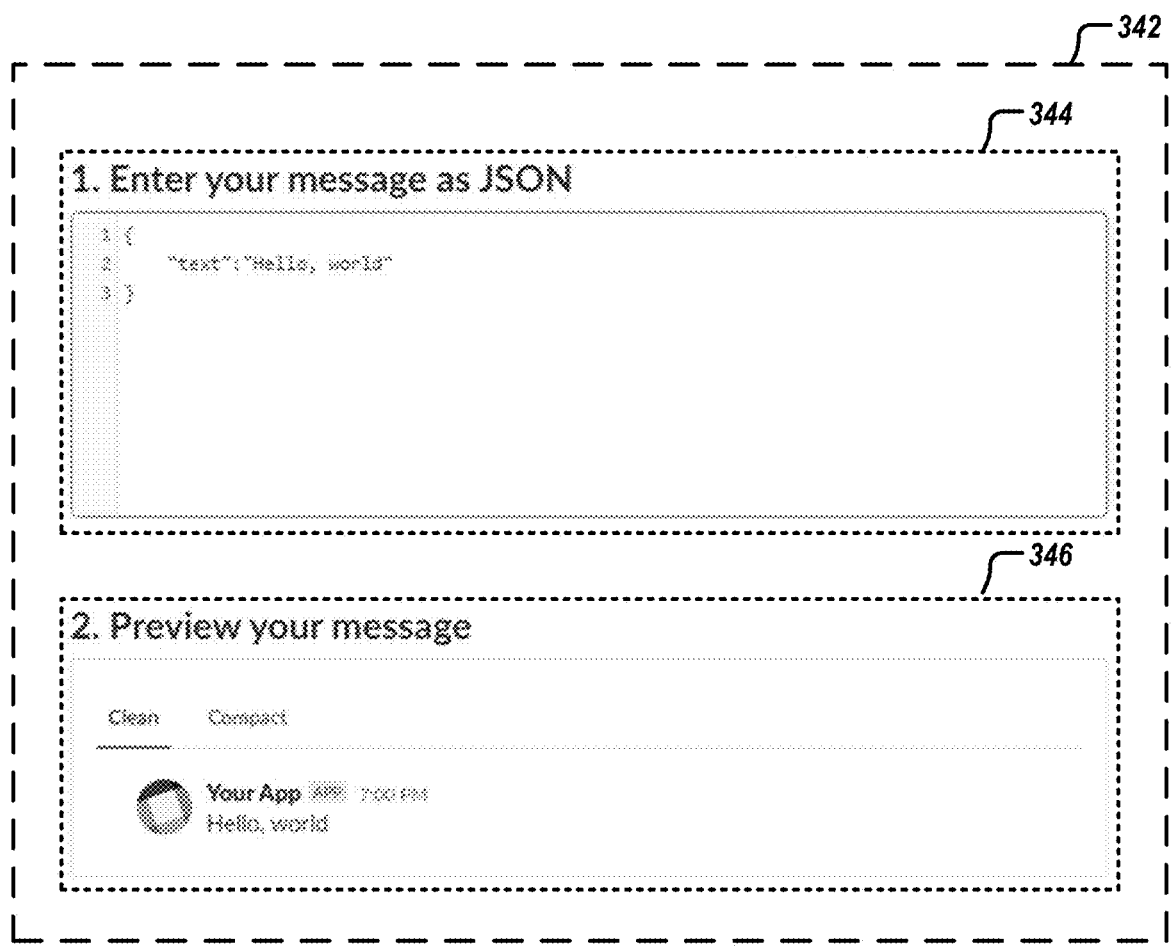

FIG. 3A, 3B, and 3C illustrate example data structures 300, 320, and 340 for inspecting an interface element viewable in a group-based communication platform interface in accordance with some example embodiments described herein. As shown in FIG. 3A, the example data structures 300 comprise an example group-based communication platform interface 302. The example group-based communication platform interface 302 comprises an interface element 304 (e.g., a message) and a selectable menu icon 306 displayed in association with the interface element 304. The example group-based communication platform interface 302 further comprises an ephemeral element definition message 308 comprising an element definition payload 310 (e.g., the raw JSON data from interface element 304). The example group-based communication platform interface 302 further comprises a selectable message builder action 312 displayed in association with the ephemeral element definition message 308. As illustrated in the example embodiment shown in FIG. 3A, the ephemeral element definition message 308 may configured to be displayed in the example group-based communication platform interface 302 as an attachment to the interface element 304.

As shown in FIG. 3B, the example data structures 320 comprise a drop down menu box 322 that is displayed in the group-based communication platform interface in association with the interface element 304 in response to a user performing a user interaction event on selectable menu icon 306. The drop down menu box 322 comprises a set of selectable actions, such as "Follow message," "Copy link," "Mark unread," "Remind me about this," "Pin too this conversation . . . ," "Edit message," "Delete message," "Inspect," and "More message actions . . . ." The set of selectable actions comprises a selectable inspect action 324 (e.g., "Inspect"). Selection of the selectable inspect action 324 by a user using a client device may cause the client device to generate and transmit electronic information indicative of a selection of the selectable inspect action 324 by the user using the client device. In one illustrative example, a user using a client device may hover over an interface element (e.g., interface element 304), click the "[. . . ]" (e.g., selectable menu icon 306), and select "Inspect" (e.g., selectable inspect action 324) to view how that particular interface element was built (e.g., to view ephemeral element definition message 308).

As shown in FIG. 3C, the example data structures 340 comprise a message builder interface 342. In some embodiments, selection of selectable message builder action 312 by a user using a client device may result in the generation and display, by the group-based communication platform, of a message builder interface 342 comprising an editable JSON element definition payload 344 and a preview message 346. In one illustrative example, a user using a client device may click "View in Message Builder" (e.g., selectable message builder action 312) to edit an interface element (e.g., interface element 304) and view a preview (e.g., preview message 346) of the edited interface element (e.g., an edited version of editable JSON element definition payload 344).

Figure 4:
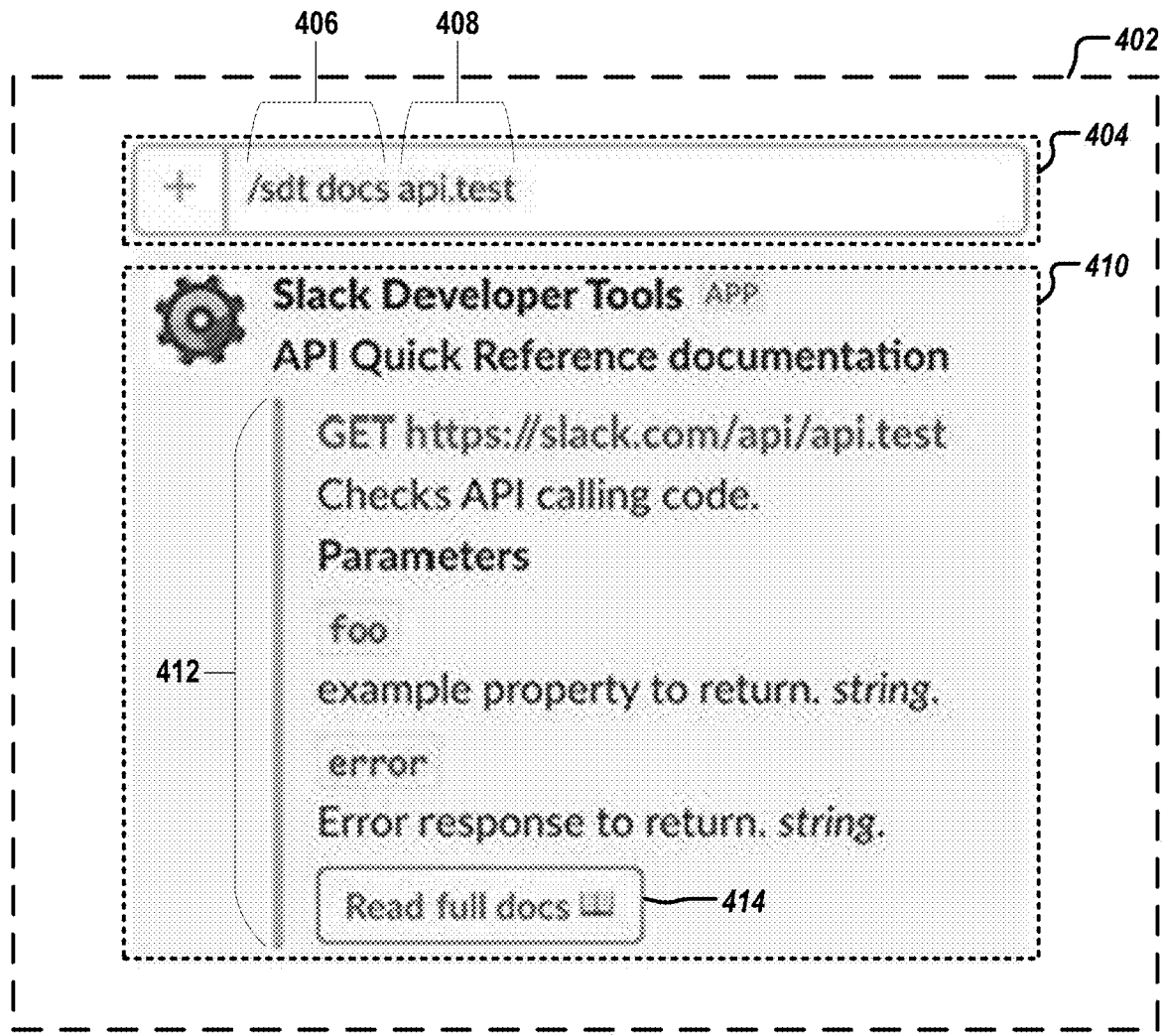
FIG. 4 illustrates example data structures for electronically retrieving documentation in the group-based communication platform interface in accordance with some example embodiments described herein.

FIG. 4 illustrates example data structures 400 for electronically retrieving documentation in the group-based communication platform interface in accordance with some example embodiments described herein. As shown in FIG. 4, the example data structures 400 comprise an example group-based communication platform interface 402. The example group-based communication platform interface 402 comprises a request 404 for group-based communication platform documentation. The request 404 (e.g., "/sdt docs api.test") may comprise a command 406 (e.g., the slash command "/sdt" and the documentation command "docs") and a requested API method name 408 (e.g., "api.test"). The example group-based communication platform interface 402 further comprises ephemeral documentation message 410. In one illustrative example, the requested API method name 408 (e.g., "api.test") may be identical to a group-based communication platform API method name (e.g., "api.test") in a set of group-based communication platform API method names included in a group-based communication platform API specification, and the ephemeral documentation message 410 may comprise group-based communication platform documentation information 412 associated with the group-based communication platform documentation API method name. In some embodiments, the group-based communication platform documentation information 412 may be a portion or subset of the group-based communication platform documentation information associated with the group-based communication platform documentation API method name comprised by the group-based communication platform API specification. For example, the group-based communication platform documentation information 412 may be an "API Quick Reference documentation" portion or subset of the group-based communication platform documentation information associated with the group-based communication platform documentation API method name. In some embodiments, the group-based communication platform documentation information 412 may further comprise a selectable documentation icon 414 (e.g., "Read full docs") comprising a link to the entire group-based communication platform documentation information associated with the group-based communication platform API method name.

Figure 5:
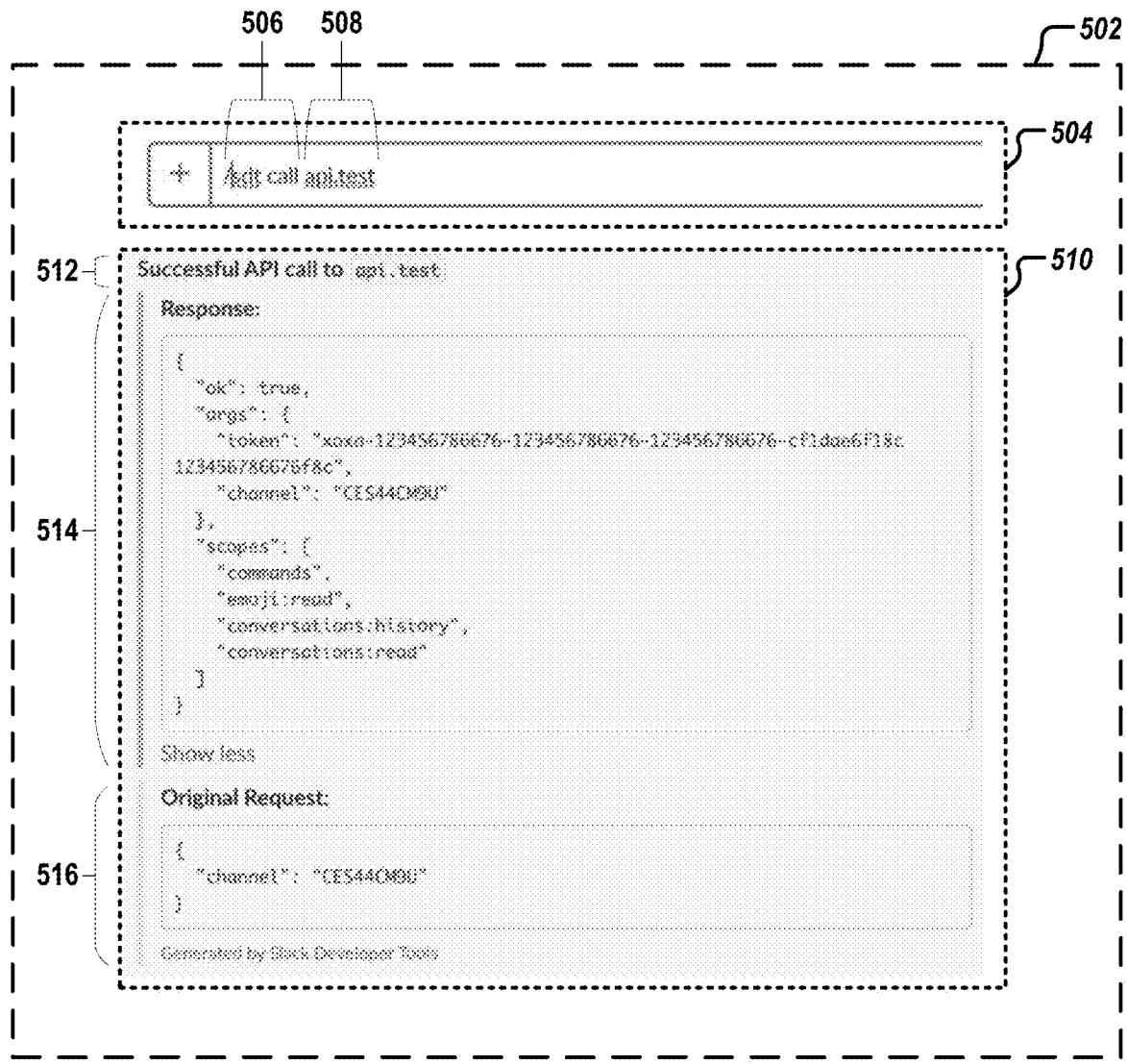
FIG. 5 illustrates example data structures for providing app-less rendering in a group-based communication platform interface in accordance with some example embodiments described herein.

FIG. 5 illustrates example data structures 500 for providing app-less rendering in a group-based communication platform interface in accordance with some example embodiments described herein. As shown in FIG. 5, the example data structures 500 comprise an example group-based communication platform interface 502. The example group-based communication platform interface 502 comprises a command 504 indicative of a request to perform an app-less API call in the group-based communication platform. The command 504 (e.g., "/sdt call api.test") may comprise electronic information indicative of a requested API method name 506 (e.g., the requested API method name "call") and a set of requested call parameters 508 (e.g., "api.test"). The example group-based communication platform interface 502 further comprises ephemeral command response message 510. The ephemeral command response message 510 may comprise an app-less API call response message 512 and, attached to the app-less API call response message 512, a response 514 to an app-less API call 516 generated based on the requested API method name 506 and the set of requested call parameters 508.

Having described specific components of example devices involved in the present disclosure, example procedures for providing improved functionality in a group-based communication platform interface are described below in connection with FIGS. 6-8.

Example Operations for Group-Based Communication

FIG. 6 illustrates an example flowchart 600 that contains example operations for providing for inspecting an interface element viewable in a group-based communication platform interface in accordance with some example embodiments described herein. The operations illustrated in FIG. 6 may, for example, be performed by one or more components described with reference to group-based communication system 102 shown in FIG. 1; by a server device 110, a client device 112, an API specification server 114, or a documentation server 116 in communication with group-based communication system 102; by apparatus 200 shown in FIG. 2; or by any combination thereof. In some embodiments, the various operations described in connection with FIG. 6 may be performed by the apparatus 200 by or through the use of one or more of processing circuitry 202, memory 204, input-output circuitry 206, communications circuitry 208, API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226, any other suitable circuitry, and any combination thereof.

As shown by operation 602, the apparatus 200 includes means, such as API circuitry 210 or the like, for receiving an inspect command indicative of a request to perform an inspect action on the interface element viewable in the group-based communication platform interface. In some embodiments, the API circuitry 210 may receive the inspect command from interface generation circuitry (e.g., interface generation circuitry 218) in communication with the API circuitry and a client device (e.g., client device 112). In some embodiments, the request to perform the inspect action may have been provided by a user using the client device. In some embodiments, the apparatus 200 may receive the inspect command as described in more detail with reference to FIGS. 1-5.

As shown by operation 604, the apparatus 200 includes means, such as inspect action response generation circuitry 212 or the like, for generating an element definition payload based on the inspect command. In some embodiments, the apparatus 200 may generate the element definition payload in response to receipt of the inspect command. In some embodiments, the apparatus 200 may generate the element definition payload as described in more detail with reference to FIGS. 1-5.

As shown by operation 606, the apparatus 200 includes means, such as inspect action response generation circuitry 212 or the like, for generating an inspect action response message comprising the element definition payload. In some embodiments, the apparatus 200 may generate the inspect action response message as described in more detail with reference to FIGS. 1-5.

As shown by operation 608, the apparatus 200 includes means, such as interface generation circuitry 218 or the like, for generating an ephemeral element definition message based on the inspect action response message. In some embodiments, the ephemeral element definition message may be configured to be displayed (e.g., by the client device, a display device in communication with the client device, or both) in the group-based communication platform interface in association with the interface element. In some embodiments, the apparatus 200 may generate the ephemeral element definition message as described in more detail with reference to FIGS. 1-5.

As shown by operation 610, the apparatus 200 includes means, such as interface generation circuitry 218 or the like, for transmitting, to the client device, the ephemeral element definition message. In some embodiments, the apparatus 200 may transmit the ephemeral element definition message as described in more detail with reference to FIGS. 1-5.

In some embodiments, operations 602, 604, 606, 608, and 610 may not necessarily occur in the order depicted in FIG. 6, and in some cases one or more of the operations depicted in FIG. 6 may occur substantially simultaneously, or additional steps may be involved before, after, or between any of the operations shown in FIG. 6.

Figure 7:
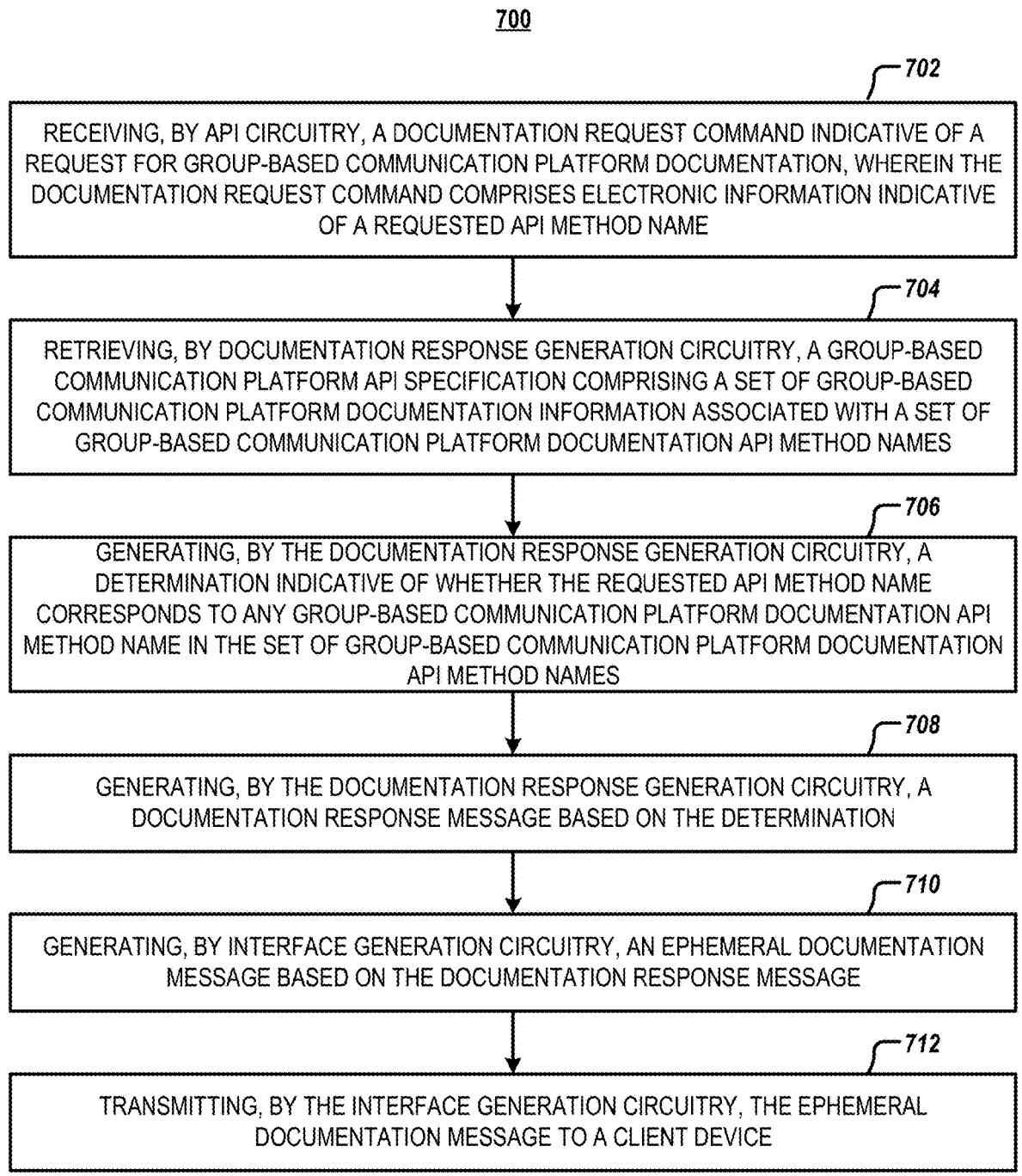
FIG. 7 illustrates an example flowchart for electronically retrieving documentation in the group-based communication platform interface in accordance with some example embodiments described herein.

FIG. 7 illustrates an example flowchart 700 that contains example operations for electronically retrieving documentation in the group-based communication platform interface in accordance with some example embodiments described herein. The operations illustrated in FIG. 7 may, for example, be performed by one or more components described with reference to group-based communication system 102 shown in FIG. 1; by a server device 110, a client device 112, an API specification server 114, or a documentation server 116 in communication with group-based communication system 102; by apparatus 200 shown in FIG. 2; or by any combination thereof. In some embodiments, the various operations described in connection with FIG. 7 may be performed by the apparatus 200 by or through the use of one or more of processing circuitry 202, memory 204, input-output circuitry 206, communications circuitry 208, API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226, any other suitable circuitry, and any combination thereof.

As shown by operation 702, the apparatus 200 includes means, such as API circuitry 210 or the like, for receiving a documentation request command indicative of a request for group-based communication platform documentation. In some embodiments, the API circuitry 210 may receive the documentation request command from interface generation circuitry (e.g., interface generation circuitry 218) in communication with the API circuitry and a client device (e.g., client device 112). In some embodiments, the request for the group-based communication platform documentation may have been provided by a user using the client device. In some embodiments, the documentation request command may comprise electronic information indicative of a requested API method name. In some embodiments, the apparatus 200 may receive the documentation request command as described in more detail with reference to FIGS. 1-5.

As shown by operation 704, the apparatus 200 includes means, such as documentation response generation circuitry 214 or the like, for retrieving a group-based communication platform API specification comprising a set of group-based communication platform documentation information associated with a set of group-based communication platform documentation API method names. In some embodiments, the apparatus 200 may retrieve the group-based communication platform API specification in response to receiving the documentation request command. In some embodiments, the apparatus 200 may retrieve the group-based communication platform API specification from an API specification server (e.g., API specification server 114). In some embodiments, the apparatus 200 may retrieve the group-based communication platform API specification as described in more detail with reference to FIGS. 1-5.

As shown by operation 706, the apparatus 200 includes means, such as documentation response generation circuitry 214 or the like, for generating a determination indicative of whether the requested API method name corresponds to any group-based communication platform documentation API method name in the set of group-based communication platform documentation API method names. In some embodiments, the apparatus 200 may generate the determination as described in more detail with reference to FIGS. 1-5.

As shown by operation 708, the apparatus 200 includes means, such as documentation response generation circuitry 214 or the like, for generating a documentation response message based on the determination. In some embodiments, the apparatus 200 may generate the documentation response message as described in more detail with reference to FIGS. 1-5.

As shown by operation 710, the apparatus 200 includes means, such as interface generation circuitry 218 or the like, for generating an ephemeral documentation message based on the documentation response message. In some embodiments, the ephemeral documentation message may be configured to be displayed (e.g., by the client device, a display device in communication with the client device, or both) in the group-based communication platform interface in association with the request for the group-based communication platform documentation. In some embodiments, the apparatus 200 may generate the ephemeral documentation message as described in more detail with reference to FIGS. 1-5.

As shown by operation 712, the apparatus 200 includes means, such as interface generation circuitry 218 or the like, for transmitting the ephemeral documentation message to the client device. In some embodiments, the apparatus 200 may transmit the ephemeral documentation message as described in more detail with reference to FIGS. 1-5.

In some embodiments, operations 702, 704, 706, 708, 710, and 712 may not necessarily occur in the order depicted in FIG. 7, and in some cases one or more of the operations depicted in FIG. 7 may occur substantially simultaneously, or additional steps may be involved before, after, or between any of the operations shown in FIG. 7.

Figure 8:
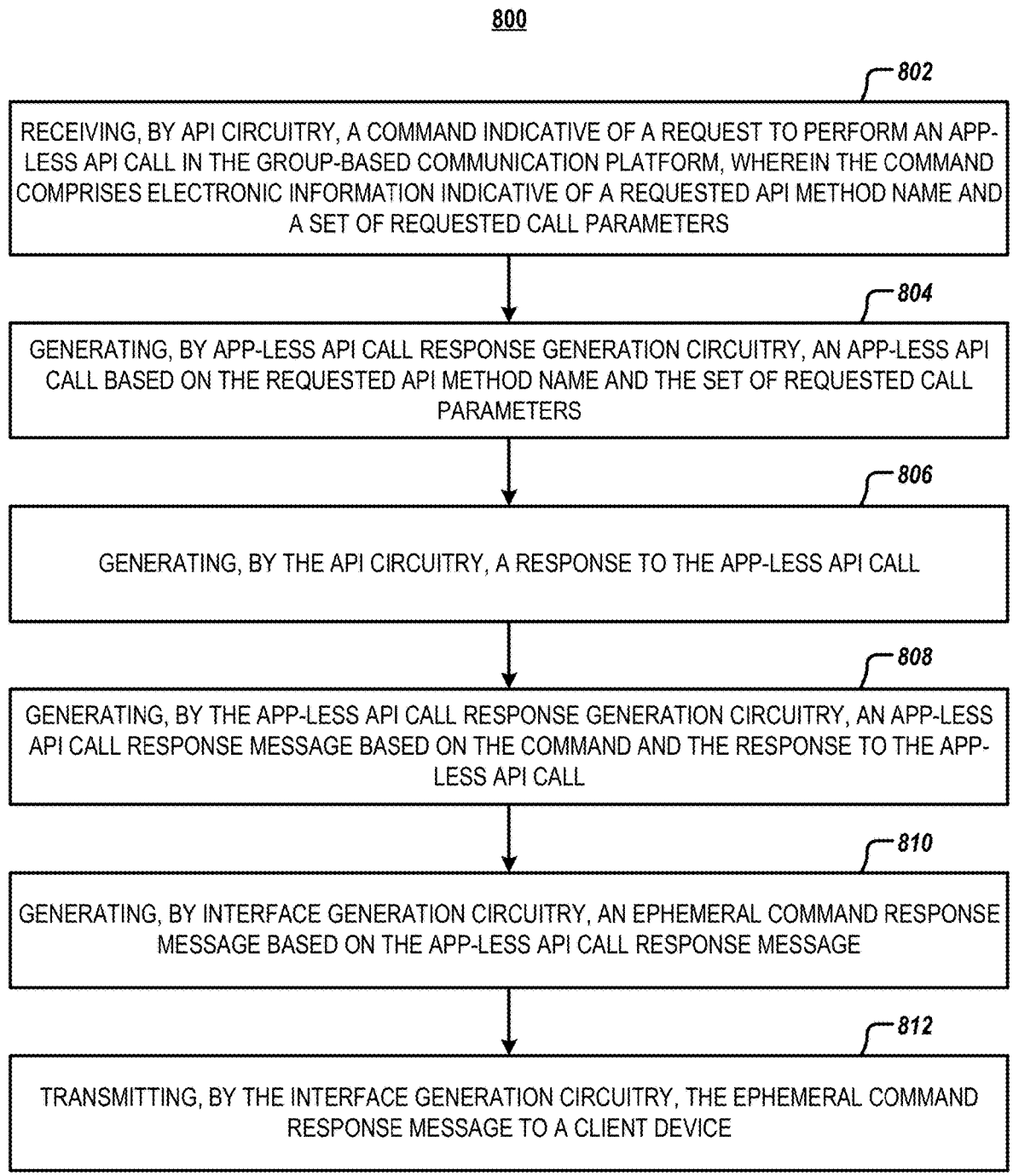
FIG. 8 illustrates an example flowchart for providing app-less rendering in a group-based communication platform interface in accordance with some example embodiments described herein.

FIG. 8 illustrates an example flowchart 800 that contains example operations for providing app-less rendering in a group-based communication platform interface in accordance with some example embodiments described herein. The operations illustrated in FIG. 8 may, for example, be performed by one or more components described with reference to group-based communication system 102 shown in FIG. 1; by a server device 110, a client device 112, an API specification server 114, or a documentation server 116 in communication with group-based communication system 102; by apparatus 200 shown in FIG. 2; or by any combination thereof. In some embodiments, the various operations described in connection with FIG. 8 may be performed by the apparatus 200 by or through the use of one or more of processing circuitry 202, memory 204, input-output circuitry 206, communications circuitry 208, API circuitry 210, inspect action response generation circuitry 212, documentation response generation circuitry 214, app-less API call response generation circuitry 216, interface generation circuitry 218, message builder circuitry 220, call builder circuitry 222, authentication circuitry 224, and NLP circuitry 226, any other suitable circuitry, and any combination thereof.

As shown by operation 802, the apparatus 200 includes means, such as API circuitry 210 or the like, for receiving a command indicative of a request to perform an app-less API call in the group-based communication platform. In some embodiments, the API circuitry 210 may receive the command from interface generation circuitry (e.g., interface generation circuitry 218) in communication with the API circuitry 210 and a client device (e.g., client device 112). In some embodiments, the request to perform the app-less API call may have been provided by a user using the client device. In some embodiments, the command comprises electronic information indicative of a requested API method name and a set of requested call parameters. In some embodiments, the apparatus 200 may receive the command as described in more detail with reference to FIGS. 1-5.

As shown by operation 804, the apparatus 200 includes means, such as app-less API call response generation circuitry 216 or the like, for generating an app-less API call based on the requested API method name and the set of requested call parameters. In some embodiments, the apparatus 200 may generate the app-less API call as described in more detail with reference to FIGS. 1-5.

As shown by operation 806, the apparatus 200 includes means, such as API circuitry 210 or the like, for generating a response to the app-less API call. In some embodiments, the apparatus 200 may generate the response to the app-less API call as described in more detail with reference to FIGS. 1-5.

As shown by operation 808, the apparatus 200 includes means, such as app-less API call response generation circuitry 216 or the like, for generating an app-less API call response message based on the command and the response to the app-less API call. In some embodiments, the apparatus 200 may generate the app-less API call response message as described in more detail with reference to FIGS. 1-5.

As shown by operation 810, the apparatus 200 includes means, such as interface generation circuitry 218 or the like, for generating an ephemeral command response message based on the app-less API call response message. In some embodiments, the ephemeral command response message is configured to be displayed (e.g., by the client device, a display device in communication with the client device, or both) in the group-based communication platform interface in association with the request to perform the app-less API call. In some embodiments, the apparatus 200 may generate the ephemeral command response message as described in more detail with reference to FIGS. 1-5.

As shown by operation 812, the apparatus 200 includes means, such as interface generation circuitry 218 or the like, for transmitting the ephemeral command response message to the client device. In some embodiments, the apparatus 200 may transmit the ephemeral command response message as described in more detail with reference to FIGS. 1-5.

In some embodiments, operations 802, 804, 806, 808, 810, and 812 may not necessarily occur in the order depicted in FIG. 8, and in some cases one or more of the operations depicted in FIG. 8 may occur substantially simultaneously, or additional steps may be involved before, after, or between any of the operations shown in FIG. 8.

As noted above, methods, apparatuses, systems, and computer program products are described herein that provide improved functionality in a group-based communication platform interface. By doing so, users of client devices are able to avoid the traditional problems surrounding group-based communication. For instance, through performance of the above operations, a user can avoid multiple interactions with the client device to inspect interface elements, retrieve documentation, and render calls in the group-based communication platform interface. Further, the group-based communication system may provide these functionalities in a faster, cheaper, and less resource and data intensive manner. Accordingly, example embodiments described herein facilitate and streamline the process of group-based communication so that the user may more quickly and easily interact with the group-based communication system.

FIGS. 6-8 thus illustrate flowcharts describing the operation of various systems (e.g., group-based communication system 102 described with reference to FIG. 1), apparatuses (e.g., apparatus 200 described with reference to FIG. 2), computer-implemented methods, and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 6-8 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

Conclusion

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated drawings. Although the drawings only show certain components of the apparatus and systems described herein, it is understood that various other components may be used in conjunction with the group-based communication system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for providing app-less rendering in a group-based communication platform interface, wherein the computing system comprises:
   one or more processors;
   a memory; and
   one or more programs, wherein the one or more programs are stored in the memory and configured to be executed by the one or more processors, the one or more programs including instructions for:
      receiving a command indicative of a request to perform an app-less API call in the group-based communication platform, wherein the request was provided by a user using a client device, and wherein the command comprises electronic information indicative of a requested API method name that corresponds to a group-based communication platform API method name and a set of requested call parameters,
      generating an app-less API call based on the requested API method name and the set of requested call parameters,
      generating a response to the app-less API call,
      generating an app-less API call response message based on the command and the response to the app-less API call
      generating an ephemeral command response message based on the app-less API call response message, wherein the ephemeral command response message is configured to be displayed, by a display device in communication with the client device, in the group-based communication platform interface in association with the request to perform the app-less API call, and wherein the ephemeral command response message comprises code that is associated with the command and the response to the app-less API call such that the code is displayed as part of the ephemeral command response message, and
      transmitting, to the client device, the ephemeral command response message.

2. The computing system of claim 1, wherein the app-less API call response message comprises a call definition payload that defines the command and the response to the app-less API call.

3. The computing system of claim 2, wherein the call definition payload that defines the command and the response to the app-less API call is a JavaScript Object Notation (JSON) call definition payload that defines the command and the response to the app-less API call.

4. The computing system of claim 3, wherein the JSON call definition payload comprises type data that defines the command, user identification data that defines the command, text data that defines the command, and timestamp data that defines the command.

5. The computing system of claim 3, wherein the JSON call definition payload comprises type data that defines the response to the app-less API call, API method identification data that defines the response to the app-less API call, text data that defines the response to the app-less API call, and timestamp data that defines the response to the app-less API call.

6. The computing system of claim 1, wherein the one or more programs include further instructions for generating a set of call builder parameters based on the command, wherein the app-less API call response message further comprises the set of call builder parameters.

7. The computing system of claim 6, wherein the one or more programs include further instructions for:
   generating a selectable call builder action configured to be displayed, by the display device, in the group-based communication platform interface in association with the app-less API call response message;
   transmitting, to the client device, the selectable call builder action; and
   receiving, from the client device, electronic information indicative of a selection of the selectable call builder action by the user using the client device.

8. The computing system of claim 7, wherein the one or more programs include further instructions for:
   generating an editable JSON call definition payload based on the app-less API call response message and the set of call builder parameters;
   generating a call builder interface comprising the editable JSON call definition payload; and
   transmitting, to the client device, the call builder interface, wherein the call builder interface is configured to be displayed by the display device.

9. The computing system of claim 1, wherein the command comprises user identification information for the user, and wherein the one or more programs include further instructions for:
   receiving a call authorization token indicating that the user has authorization to view the response to the app-less API call, wherein the call authorization token was generated based on the user identification information and the response to the app-less API call; and
   in response to receipt of the call authorization token, generating the app-less API call response message.

10. The computing system of claim 1, wherein the ephemeral command response message is configured to be displayed, by the display device, in the group-based communication platform interface as an attachment to the request to perform the app-less API call.

11. The computing system of claim 1, wherein the ephemeral command response message comprises computer code for the response to the app-less API call that is displayed by the display device.

12. A computer-implemented method for providing app-less rendering in a group-based communication platform interface, the computer-implemented method comprising:
   receiving a command indicative of a request to perform an app-less API call in the group-based communication platform, wherein the request was provided by a user using a client device, and wherein the command comprises electronic information indicative of a requested API method name that corresponds to a group-based communication platform API method name and a set of requested call parameters;
   generating an app-less API call based on the requested API method name and the set of requested call parameters;
   generating a response to the app-less API call;
   generating an app-less API call response message based on the command and the response to the app-less API call;
   generating an ephemeral command response message based on the app-less API call response message, wherein the ephemeral command response message is configured to be displayed, by a display device in communication with the client device, in the group-based communication platform interface in association with the request to perform the app-less API call, and wherein the ephemeral command response message comprises code that is associated with the command and the response to the app-less API call such that the code is displayed as part of the ephemeral command response message; and transmitting, to the client device, the ephemeral command response message.

13. The computer-implemented method of claim 12, wherein the app-less API call response message comprises a call definition payload that defines the command and the response to the app-less API call.

14. The computer-implemented method of claim 13, wherein the call definition payload that defines the command and the response to the app-less API call is a JavaScript Object Notation (JSON) call definition payload that defines the command and the response to the app-less API call.

15. The computer-implemented method of claim 14, wherein the JSON call definition payload comprises type data that defines the command, user identification data that defines the command, text data that defines the command, and timestamp data that defines the command.

16. The computer-implemented method of claim 14, wherein the JSON call definition payload comprises type data that defines the response to the app-less API call, API method identification data that defines the response to the app-less API call, text data that defines the response to the app-less API call, and timestamp data that defines the response to the app-less API call.

17. The computer-implemented method of claim 12, further comprising generating a set of call builder parameters based on the command, wherein the app-less API call response message further comprises the set of call builder parameters.

18. The computer-implemented method of claim 17, further comprising:

generating a selectable call builder action configured to be displayed, by the display device, in the group-based communication platform interface in association with the app-less API call response message;

transmitting, to the client device, the selectable call builder action; and receiving, from the client device, electronic information indicative of a selection of the selectable call builder action by the user using the client device.

19. The computer-implemented method of claim 18, further comprising:

generating an editable JSON call definition payload based on the app-less API call response message and the set of call builder parameters;

generating a call builder interface comprising the editable JSON call definition payload; and transmitting, to the client device, the call builder interface, wherein the call builder interface is configured to be displayed by the display device.

20. The computer-implemented method of claim 12, wherein the command comprises user identification information for the user, and wherein the computer-implemented method further comprises:

receiving a call authorization token indicating that the user has authorization to view the response to the app-less API call, wherein the call authorization token was generated based on the user identification information and the response to the app-less API call; and in response to receiving the call authorization token, generating the app-less API call response message.

21. A computer program product for providing app-less rendering in a group-based communication platform interface, wherein the computer program product comprises at least one non-transitory computer-readable storage medium storing computer-executable program code instructions that, when executed by a computing system, cause the computing system to:

receive a command indicative of a request to perform an app-less API call in the group-based communication platform, wherein the request was provided by a user using a client device, and wherein the command comprises electronic information indicative of a requested API method name that corresponds to a group-based communication platform API method name and a set of requested call parameters;

generate an app-less API call based on the requested API method name and the set of requested call parameters;

generate a response to the app-less API call;

generate an app-less API call response message based on the command and the response to the app-less API call;

generate an ephemeral command response message based on the app-less API call response message, wherein the ephemeral command response message is configured to be displayed, by a display device in communication with the client device, in the group-based communication platform interface in association with the request to perform the app-less API call, and wherein the ephemeral command response message comprises code that is associated with the command and the response to the app-less API call such that the code is displayed as part of the ephemeral command response message; and transmit, to the client device, the ephemeral command response message.

* * * * *